(12) United States Patent
Itoi

(10) Patent No.: US 6,477,313 B1
(45) Date of Patent: Nov. 5, 2002

(54) DISC CONTROL METHOD AND DISC CONTROL UNIT

(75) Inventor: Satoshi Itoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/234,412

(22) Filed: Jan. 21, 1999

(30) Foreign Application Priority Data

Jan. 21, 1998 (JP) .......................................... 10-009924

(51) Int. Cl.$^7$ .............................................. G11B 27/00
(52) U.S. Cl. ........................... 386/52; 386/111; 386/95; 386/125; 360/13; 360/32
(58) Field of Search ............................. 386/4, 45, 52, 386/81–82, 95, 111–112, 125–126; 360/13, 32

(56) References Cited

U.S. PATENT DOCUMENTS

| | | | | |
|---|---|---|---|---|
| 5,734,788 A | * | 3/1998 | Nonomura et al. | 386/125 |
| 5,787,222 A | * | 7/1998 | Tozaki et al. | 386/46 |
| 5,907,659 A | * | 5/1999 | Yamauchi et al. | 386/125 |
| 5,949,953 A | * | 9/1999 | Shirakawa et al. | 386/70 |
| 6,067,400 A | * | 5/2000 | Saeki et al. | 386/125 |
| 6,118,924 A | * | 9/2000 | Nakatani et al. | 386/125 |
| 6,157,769 A | * | 12/2000 | Yoshimura et al. | 386/68 |
| 6,160,951 A | * | 12/2000 | Tozaki et al. | 386/46 |
| 6,167,189 A | * | 12/2000 | Taira et al. | 386/112 |
| 6,330,394 B1 | * | 12/2001 | Itoi | 386/113 |

FOREIGN PATENT DOCUMENTS

| | | | |
|---|---|---|---|
| JP | WO95-23411 | 8/1995 | G11G/20/12 |
| JP | 7-287968 | 10/1995 | G11B/27/10 |
| JP | 8-18914 | 1/1996 | H04N/5/92 |
| JP | 8-96310 | 4/1996 | G11B/5/09 |
| JP | 8-111072 | 4/1996 | G11B/20/18 |
| JP | 8-212710 | 8/1996 | G11B/20/12 |
| JP | 9-106629 | 4/1997 | G11B/20/12 |
| JP | 9-265733 | 10/1997 | G11B/20/12 |

\* cited by examiner

Primary Examiner—Andrew Christensen
Assistant Examiner—Polin Chieu
(74) Attorney, Agent, or Firm—McGinn & Gibb, PLLC

(57) ABSTRACT

A video/audio data coding circuit receives video/audio signals and compresses and multiplexes them. A recording signal processing circuit shuffles the audio/video data, adds ECCs, and codes them for recording. A CPU control circuit controls a control ECC block addition circuit to generate control ECC blocks and sends them to the recording signal processing circuit. At the same time, the CPU control circuit controls an optical head and a spindle motor. The data is written onto a disc by the optical head. And, after editing, the control ECC blocks are written. At playback time, the control ECC blocks are read from the disc and sent to a control ECC block playback circuit where they are played back. The CPU control circuit controls the optical head, spindle motor, and so on with the played-back control ECC blocks and commands. Video/audio data is read from the disc by the optical head. A played-back signal processing circuit decodes the data, checks for errors, and de-shuffles the data. A video/audio data decoding circuit decompresses and outputs the video/audio data.

22 Claims, 26 Drawing Sheets

DISC CONTROL METHOD AND DISC CONTROL UNIT

BACKGROUND OF THE INVENTION

The present invention relates to a disc control method and a disc control unit for recording digital video data, audio data, and user data onto disc media including magneto-optic discs, phase-change discs, and magnetic disks.

Conventionally, a Digital Video Disc (DVD) unit has been used for playing back digital video data from a disc. A DVD, a 12 cm optical disc capable of storing 4.7 GB of compressed digital data, allows the user to play back at least two hours of video/audio data.

Also available for use in recording and playing back digital data to or from a disc is a DVD-RAM unit. The DVD-RAM unit, capable of storing 2.6 GB of digital data on a 12 cm phase-change disc, allows the user to record and play back digital data repeatedly.

FIG. 24 is a block diagram showing the configuration of a DVD-RAM unit. The unit records and plays back video/audio data as follows. Upon receiving video/audio data 2401, a video/audio coding circuit 2402 compresses and multiplexes the data. A recording signal processing circuit 2403 shuffles the data and adds error correcting codes to it. A head 2405 writes the coded video/audio data from the recording signal processing circuit 2403 onto a disc 2406 under control of a CPU control circuit 2404. To play back video/audio data, the head 2405 reads data from the disc 2406. The CPU control circuit 2404 controls the optical head, spindle motors, and so on. A played-back signal processing circuit 2407 checks the data for errors and corrects them, if necessary, and de-shuffles the data. A video/audio decoding circuit 2408 decodes the data and sends the decoded video/audio data to an output section 2409.

The DVD described above contains data called "navigation data." The navigation data is not video/audio data but disc management data provided to help the user fully utilize video/audio data on the disc. The navigation data, which appears once or more times on the disc, is composed of the following data:

① Where is a program located on the disc? Correspondence between program numbers and program recording addresses is recorded. This data allows the user to know where each program is recorded on the disc.

② Special playback data (fast forward, fast rewind, slow playback) An address to which control is to be passed next is recorded for each rotation speed.

③ At which address is playback data recorded when a multi-language option (Japanese, English) is selected?

④ At which address is playback data recorded when a multi-angle option (viewing direction; for a baseball game, in the center fielder direction or in the catcher direction) is selected?

⑤ At which address is playback data recorded when a multi-story option (a happy ending or tragedy) is selected?

⑥ Others

Read-only DVD's navigation data is not changed once recorded, while writable DVD's navigation data may be changed. In addition, unusable data exits. For example, because video/audio data is variable-length, navigation data such as ① and ② is rewritten. On the other hand, multi-option data such as ③, ④, and ⑤, cannot be recorded in real time while maintaining synchronization. That is, a problem with conventional navigation data is that it is designed for read-only. Basically, it is not re-written.

Although the DVD-RAM unit is described above as a video data recording unit, it is not designed for recording video data in practice. Therefore, the DVD-RAM unit has not video data recording navigation data.

SUMMARY OF THE INVENTION

In view of the foregoing, it is an object of this invention to provide a disc control method for recording and playing back first data, second data, and control data on a disc medium, the control data being generated by a CPU (Central Processing Unit) control circuit, wherein the control data contains:

a. a number of a first data group, a sector number of the first data group, an offset block number containing second data groups synchronizing with the first data group, and a sequence number of the starting second data group within the offset block;

b. the number of a destination first data group after which first data groups to be merged, the number of first data groups to be merged, and the number of the first data group from which first data groups are to be merged, for changing a sequence of first data groups during playback;

c. the number of a destination sector after which blocks are to be inserted, the number of blocks to be inserted, and the number of the sector from which blocks are to be inserted, for changing the sequence of blocks during recording; or d. the number of the block containing a destination second data group after which second data groups are to be inserted, the sequence number of the destination second data group within the block, the number of second data groups to be inserted, and the number of the block from which second data groups are to be inserted, for changing the sequence of second data groups during recording, the disc control method comprising the steps of:

a. when recording data,
 (i) reading the control data from the disc when the control data is on the disc;
 (ii) reading data;
 (iii) recording the data on the disc by referencing the control data; and
 (vi) recording the updated control data on the disc; and b. when playing back data,
 (i) reading the control data from the disc;
 (ii) playing back data from the disc according to the control data; and
 (iii) outputting the data.

For example, this method allows the user not only to play back video data and its synchronizing audio data but also to re-write them as well as their control data. Therefore, the user can re-write data and, in addition, perform a quick and precise search, special playback (fast-forward, fast rewind, slow playback), and editing easily even for data that was re-written.

DESCRIPTION OF THE PREFERRED EMBODIMENTS

Referring to FIGS. 1 to 23, an embodiment according to the present invention will be described.

In this embodiment, compressed digital video/audio data is recorded. Video data is compressed by MPEG-2 (Moving Picture Experts Group) and is processed in GOPs (Group Of Pictures). Audio data is compressed by MPEG-1 and is processed in audio frames.

On an optical disc, an Error Correction Code (ECC) block consists of 16 sectors (32 Kbytes, 32768 bytes), each sector consisting of 2 Kbytes (2048 bytes). An error correction code is added to each ECC block. Most ECC blocks contain video/audio data, while some ECC blocks, called control ECC blocks, contain disc control data. A control ECC block is in one of the following four modes:

① GOP Information Mode (GIM)

Figure 1:
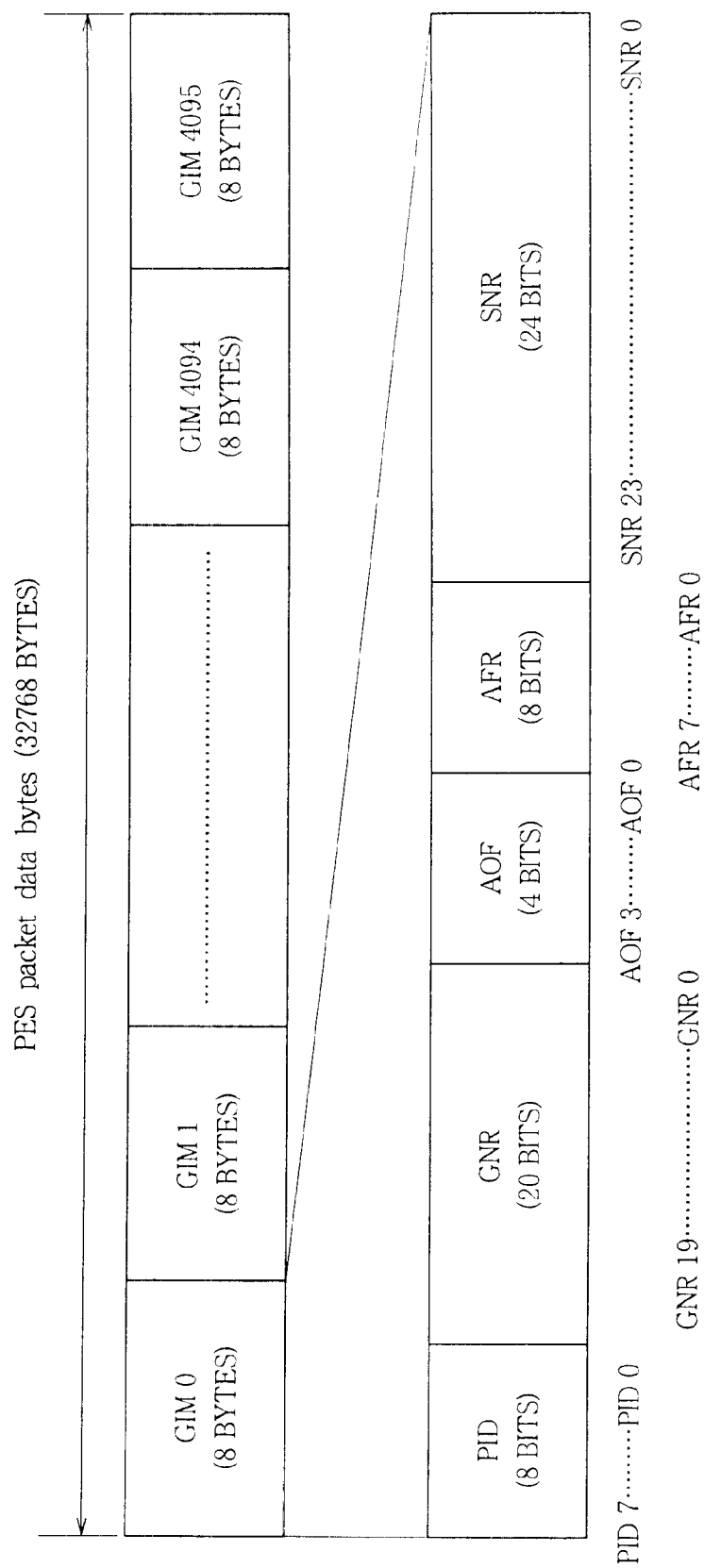
FIG. 1 is a diagram showing the configuration of an ECC control block in the GOP Information Mode (GIM).

FIG. 1 shows an ECC block in the GOP information mode. In this mode, the control ECC block contains starting ECC block numbers of all GOPs of video data on the disc. The ECC block is divided into 4096 groups each consisting of eight bytes. Each eight bytes are further divided into the following five: PID (8 bits), GNR (20 bits), AOF (4 bits), AFR (8 bits), and SNR (24 bits). Each contains the following data:

PID (PID7–PID0) Private ID

PID7–PID5 The value of "000" indicates that the ECC block is in the GIM mode (GOP information mode).

PID4–PID0 Reserved (all zeros)

GNR (GNR19–GNR0) GOP Number

These 20 bits contain a GOP number of a GOP on the disc. When one GOP consists of 15 frames, this 20-bit field may represent up to 145 hours of data.

AOF (AOF3–AOF0) Audio Data Offset

These bits contain the relative starting block number of an audio ECC block containing audio frame data synchronizing with the GOP indicated by GNR. The value of "0H" means the 0th audio ECC block which is the next audio ECC block.

AFR (AFR7–AFR0) Audio Data Frame

These bits contain the starting frame number within an audio ECC block synchronizing with the GOP indicated by GNR. The value of "00" means the audio frame start with the first frame. Because a GOP does not synchronize with an audio frame, an attempt to force the start of a GOP in video data with the start of an audio frame causes a maximum of (time per audio frame/2) difference.

SNR (SNR23–SNR0) Sector Number

These 24 bits contain the sector number of the GOP indicated by the GOP number. The most significant 20 bits (MSB) indicate the ECC block number. Because one sector consists of 2 Kbytes, 24 bits may represent up to 33 Gbytes. For example, on an optical disc recorder capable of recording two hours of video data, 14400 GOPs may be saved. In this case, because one ECC block contains 4096 GOPs, GIM requires 4 ECC blocks.

② GOP Merge Information Mode (GMM)

Figure 2:
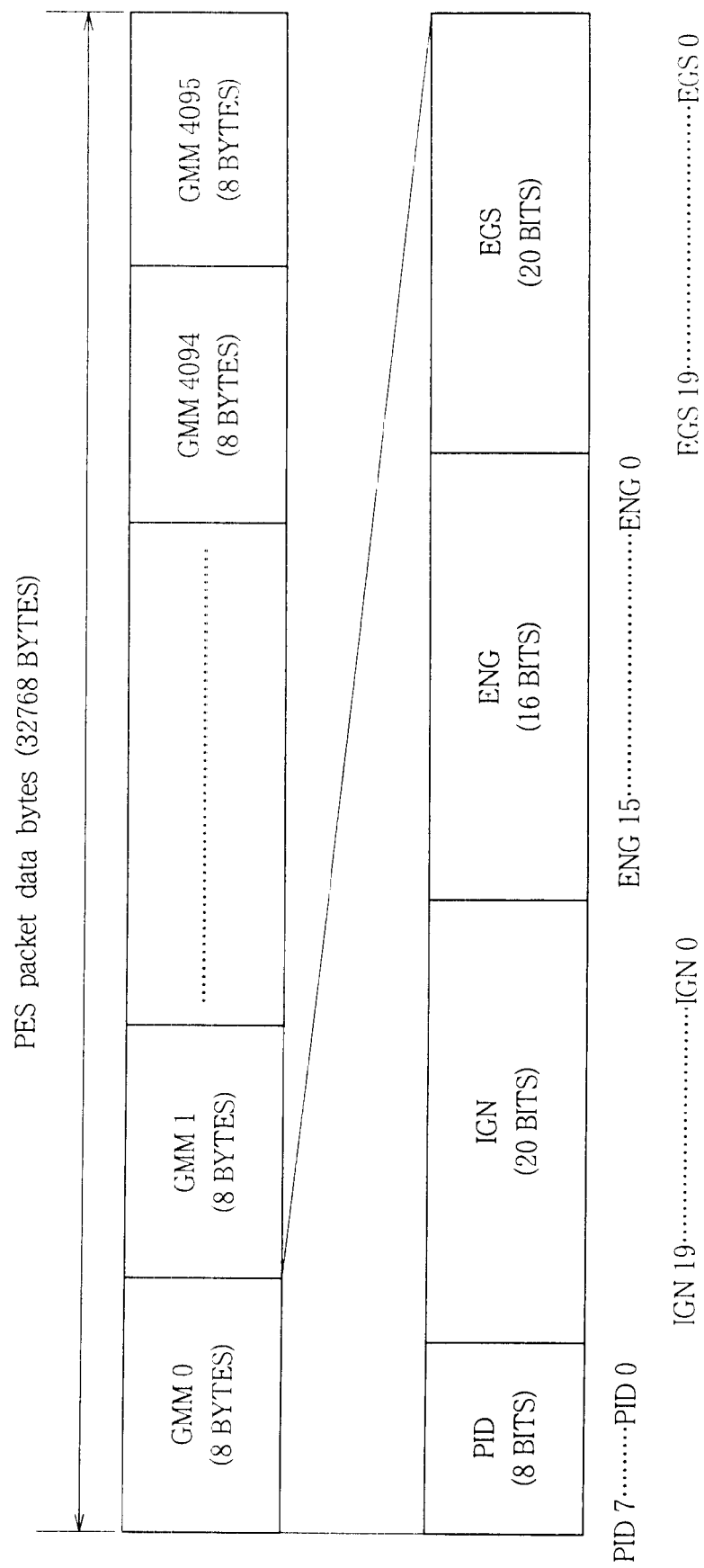
FIG. 2 is a diagram showing the configuration of an ECC control block in the GOP Merge Information Mode (GMM).

FIG. 2 shows an ECC block in the GOP merge information mode. GMM is used to change the playback sequence in GOP units, for example, when video data in different positions on a disc must be merged for playback. The ECC block is divided into 4096 groups each consisting of eight bytes. Each eight bytes are further divided into the following four: PID (8 bits), IGN (20 bits), ENG (16 bits), and EGS (20 bits).

Each Contains the Following Data:

PID (PID7–PID0) Private ID

PID7–PID5The value of "001" indicates that the ECC block is in the GMM mode (GOP merge information mode).

PID4–PID0 Reserved (all zeros)

IGN (IGn19–IGN0) Merge destination GOP number

These bits contain the number of the GOP after which data is to be merged.

ENG (ENG15–ENG0) Number of GOPs to be merged
These bits contain the number of GOPs to be merged.

EGS (EGS19–EGS0) Merge start GOP number

The number of GOPs indicated by ENG are merged after the GOP whose number is indicated by IGN. If ENG is exhausted, the merge operation is repeated.

③ Edit Jump Information Mode (EJP)

Figure 3:
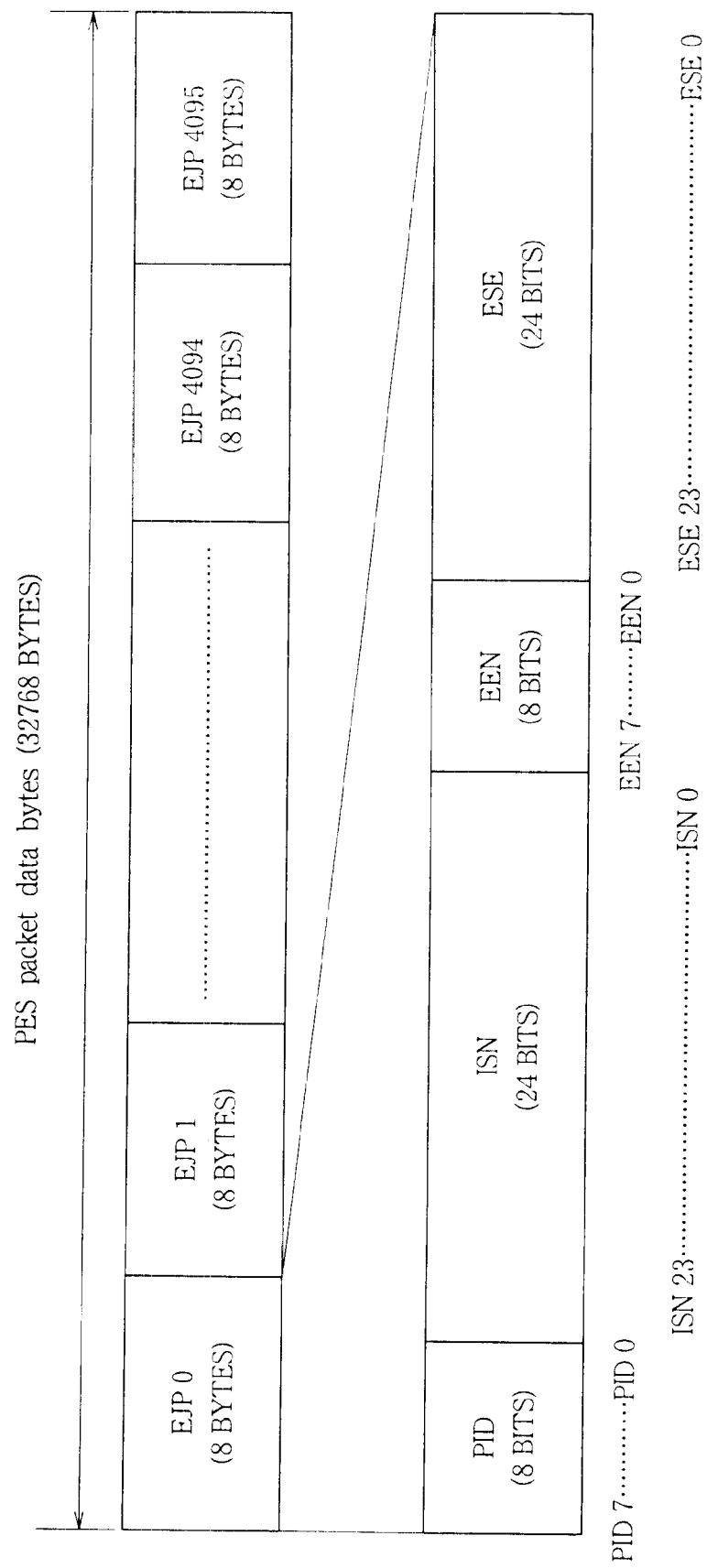
FIG. 3 is a diagram showing the configuration of an ECC control block in the Edit Jump Mode (EJP).

FIG. 3 shows an ECC block in the edit jump information mode. EJP is used to change the playback sequence on an ECC block basis, for example, when data was edited on the disc.

The ECC block is divided into 4096 groups each consisting of eight bytes. Each eight bytes are further divided into the following four: PID (8 bits), ISN (24 bits), EEN (8 bits), and ESE (24 bits). Each contains the following data:

PID (PID7–PID0) Private ID

PID7–PID5 The value of "010" indicates that the ECC block is in the EJP mode (edit jump information mode).

PID4–PID0 Reserved (all zeros)

ISN (ISN23–ISN0) Insertion destination sector number

These bits contain the number of the sector after which data is to be inserted.

EEN (EEN7–EEN0) Number of ECC blocks to be inserted

These bits contain the number of ECC blocks to be inserted.

ESE (ESE23–ESE0) Insertion start sector number

These bits contain the start number of the sector from which data is to be inserted. Note that an ECC block number may be specified in the MSB 20 bits (most significant 20 bits) with the 4 LSB bits always set to zeros. ④ Audio Jump Information Mode (AJP)

Figure 4:
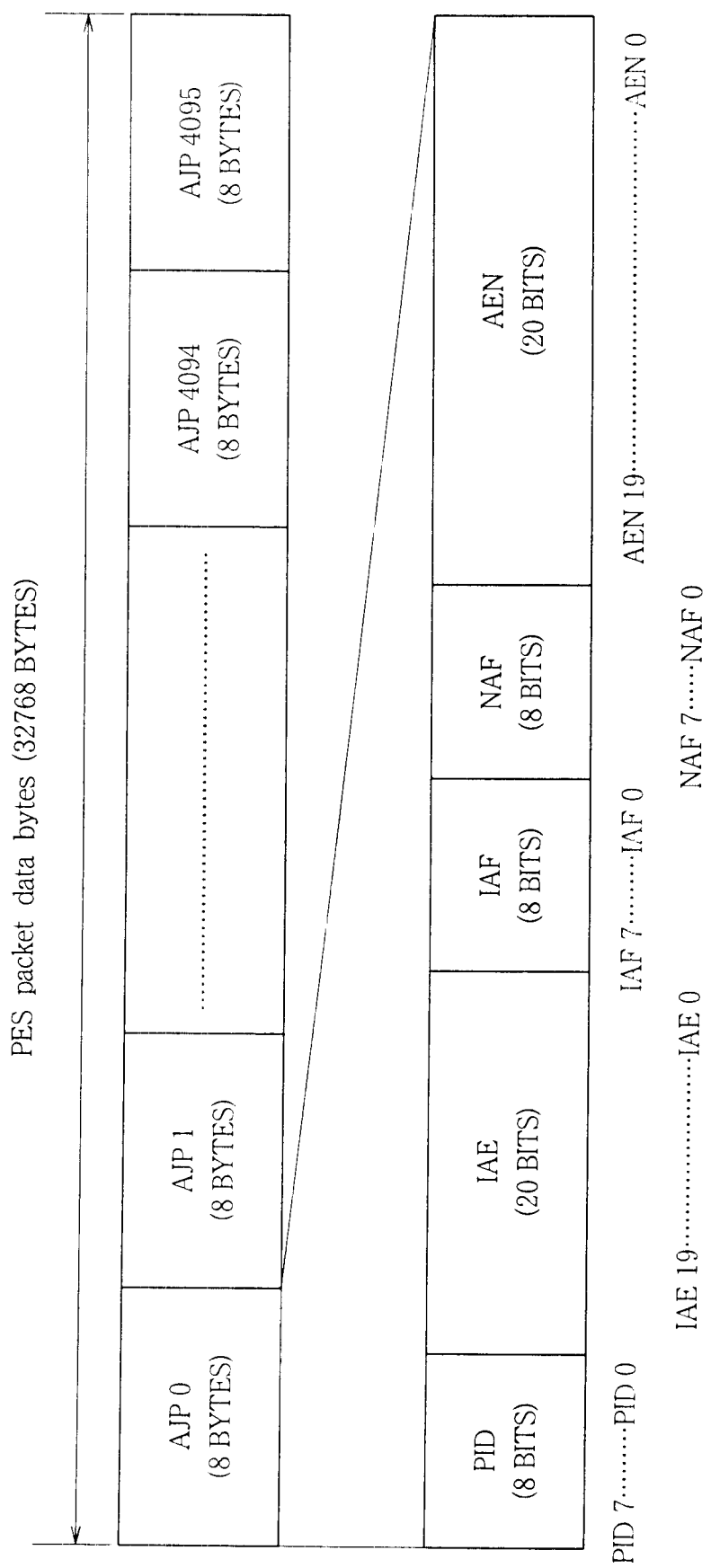
FIG. 4 is a diagram showing the configuration of an ECC control block in the Audio Jump Information Mode (AJP).

FIG. 4 shows an ECC block in the audio jump information mode. AJP is used to change the sequence of playback on an audio frame basis, for example, when video/audio data was edited on the disc. The ECC block is divided into 4096 groups each consisting of eight bytes. Each eight bytes are further divided into the following five: PID (8 bits), IAE (20 bits), IAF (8 bits), NAF (8 bits), and AEN (20 bits).

Each Contains the Following Data:

PID (PID7–PID0) Private ID

PID7–PID5 The value of "011" indicates that the ECC block is in the AJP mode (audio jump information mode).

PID4–PID0 Reserved (all zeros)

IAE (IAE19–IAE0) Destination audio ECC block number
These bits contain the number of the ECC block in which source audio frames are to be inserted.

IAF (IAF7–IAF0) Destination audio frame number
These bits contain the number of the source audio frame within the ECC block indicated by IAE after which audio frames are to be inserted.

NAF (NAF7–NAF0) Number of audio frames to be inserted These bits contain the number of audio frames to be inserted.

AEN (AEN19–AEN0) Insertion ECC block number
These bits contain the number of the ECC block in which the first audio frame to be inserted in included.

The following describes how special playback and editing functions are executed by the control information described above.

Figure 5:
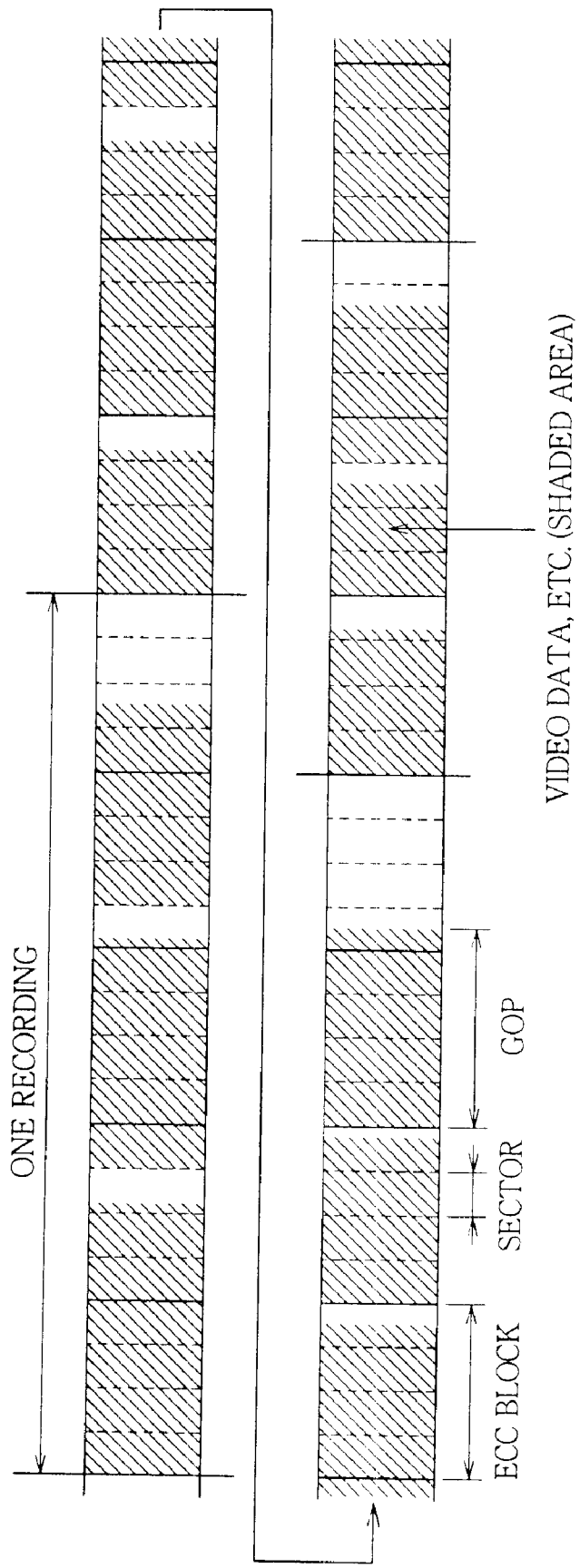
FIG. 5 is a diagram showing data recorded on a disc.
Figure 6:
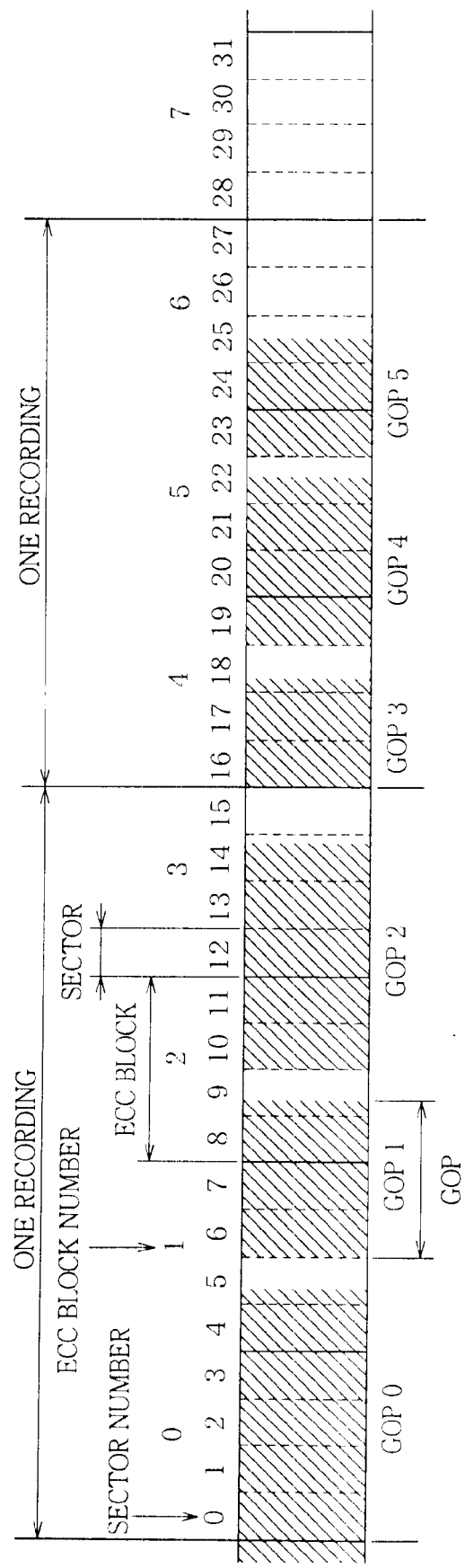
FIG. 6 is a diagram showing data recorded on a disc (Sector numbers, ECC block numbers, GOP numbers are added.)

FIG. 5 shows how video and other data are recorded on a disc. FIG. 6 shows data on a disc with sector numbers, ECC block numbers, and GOP numbers added. In FIGS. 5–22, sectors are delimited by dotted lines and ECC blocks are delimited by solid lines. For convenience, an ECC block consists of four sectors. Shaded areas contain data such as compressed video data.

GOPs are aligned on sectors. That is, when GOP data ends in the middle of a sector, meaningless data (stuffing bytes) is filled to the end of the sector. The next GOP begins at the start of the next sector. Also, recording of data is aligned on ECC blocks. That is, when recording of data ends in the middle of an ECC block, staffing bytes are filled to the end of the ECC block. The next recording begins at the start of the next ECC block. In FIGS. 5–22, one shaded area corresponds to one GOP.

In FIG. 6, when data is recorded as shown in FIG. 6, disc control data is recorded as follows: GIM (GOP information mode) GNR (GOP number):0 SNR (sector number):0

In FIG. 6, GOP0 begins at sector number 0. The subsequent GOP numbers (GNR) and sector numbers (SNR) are as follows:

GNR:1 SNR:6
GNR:2 SNR:10
GNR:3 SNR:16
GNR:4 SNR:19
GNR:5 SNR:23

Note that AOF (audio offset) and AFR (audio frame) are unused (all zeros).

Figure 7:
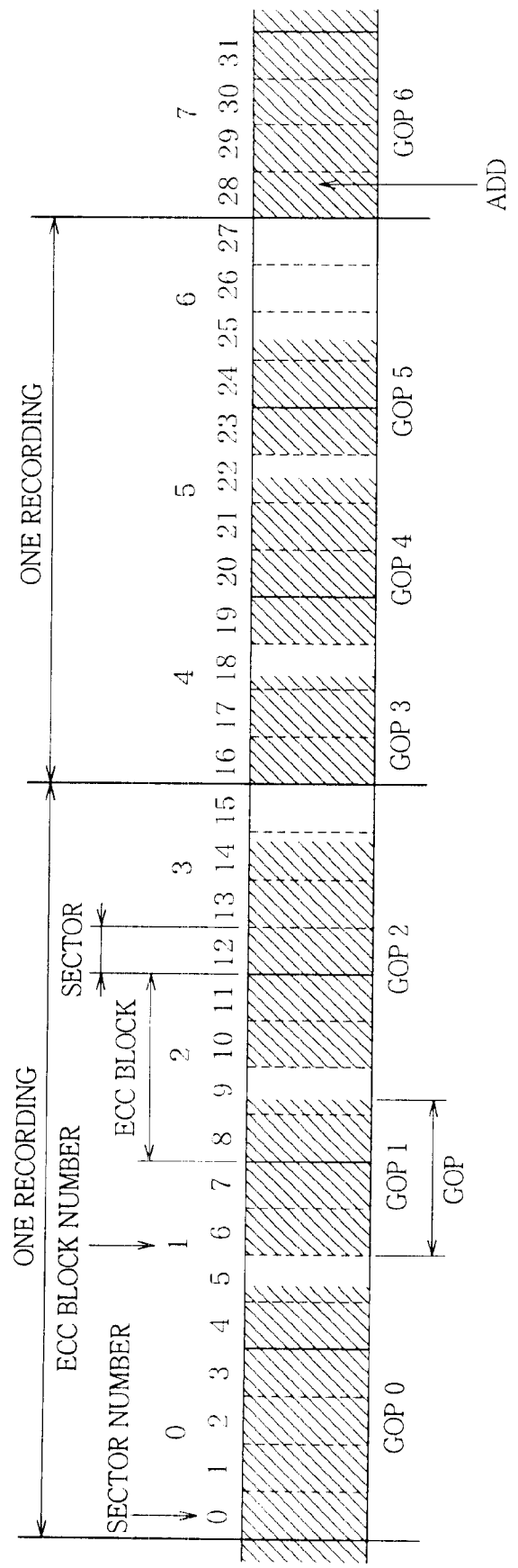
FIG. 7 is a diagram showing recorded data after the add operation.

Next, the add operation is described. The add operation starts at the beginning of the ECC block immediately following the end of data recorded by the immediately-preceding record operation. FIG. 7 shows how data is added. In FIG. 7, data was recorded in GOP0 to GOP5 before the add operation. At this time, the disc control data is as follows:

GIM (GOP Information Mode)
GNR (GOP number):0 SNR (sector number):0
GNR:1 SNR:6
GNR:2 SNR:10
GNR:3 SNR:16
GNR:4 SNR:19
GNR:5 SNR:23

Note that AOF (audio offset) and AFR (audio frame) are unused (all zeros). As the result of the add operation, the following data is added to the control data described above:
GNR:6 SNR:28

Figure 8:
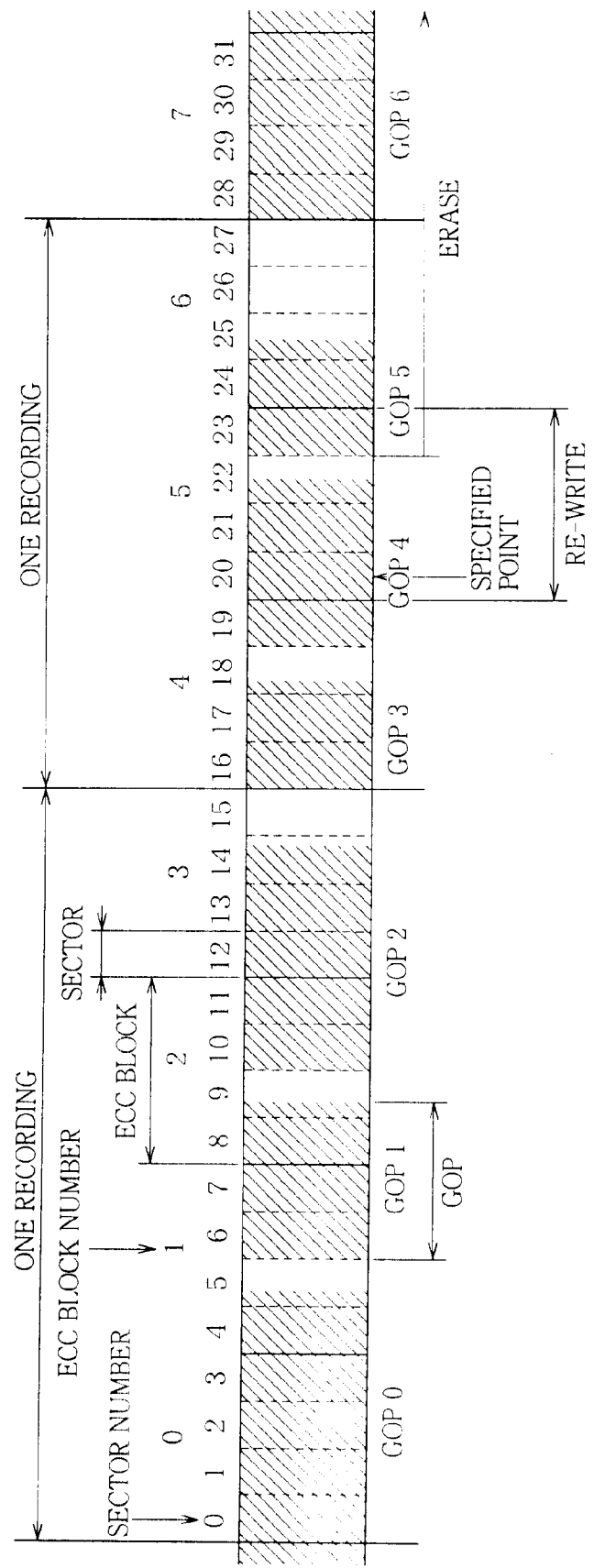
FIG. 8 is a diagram showing recorded data after the after-specified-point erase operation.

Next, the after-specified-point erase operation is described. FIG. 8 shows recorded data. In FIG. 8, GOP0–GOP6 are recorded before the erase operation. At this time the disc control data is as follows:

GIM (GOP Information Mode)
GNR (GOP number):0 SNR (sector number):0
GNR:1 SNR:6
GNR:2 SNR:10
GNR:3 SNR:16
GNR:4 SNR:19
GNR:5 SNR:23
GNR:6 SNR:28

Note that AOF (audio offset) and AFR (audio frame) are unused (all zeros). When the after-specified-point erase operation is executed, the erase operation starts at the beginning of the sector to which the GOP immediately following the GOP containing the specified point belongs. That is, when the specified point is in sector 20 of GOP4 in the fifth ECC block, GOP5 and GOP6 are erased.

Note that data may or may not actually be erased. And, the erase operation varies according to whether data is actually erased or not. For an ECC block in which some sectors are actually erased but some are not (for example, the fifth ECC block in FIG. 8), data to be erased is erased and filled with stuffing bytes. Then, the ECC is added to the block, which is then recorded again. When data is actually not erased, data remains unchanged and the playback operation is performed assuming that the erase operation was performed only on the disc control data. That is, the playback operation ends in GOP4. In this case, the next recording operation starts in the sixth ECC block. Data in the 23rd sector in the fifth ECC block remains unchanged. After the erase operation, the disc control data is as follows:

GIM (GOP Information Mode)
GNR (GOP number):0 SNR (sector number):0
GNR:1 SNR:6
GNR:2 SNR:10
GNR:3 SNR:16
GNR:4 SNR:19

Note that AOF (audio offset) and AFR (audio frame) are unused (all zeros).

Figure 9:
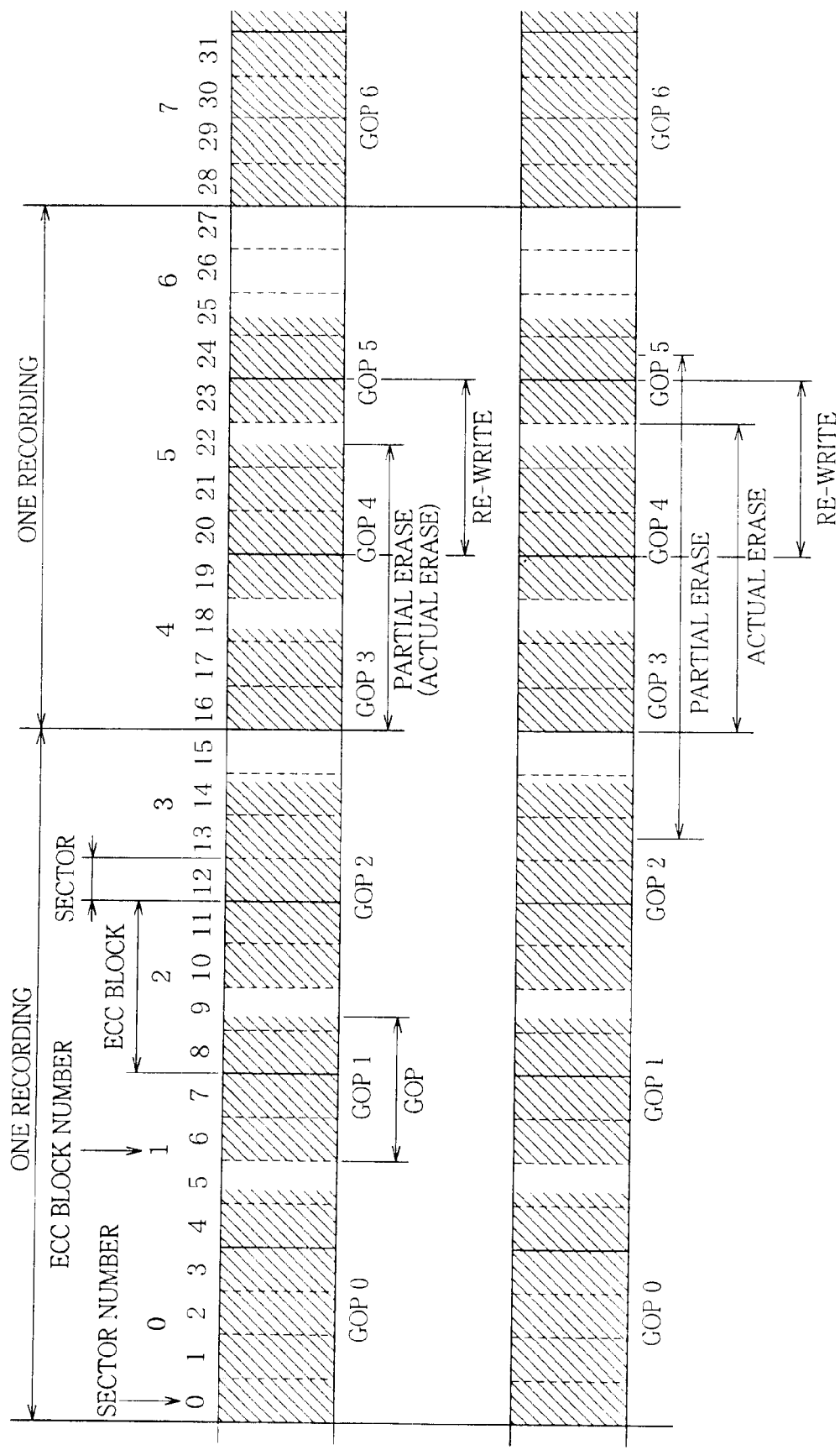
FIG. 9 is a diagram showing recorded data after the partial erase operation.

Next, the partial erase operation is described. FIG. 9 shows recorded data. In FIG. 9, GOP0–GOP6 are recorded before the erase operation. At this time the disc control data is as follows:

GIM (GOP Information Mode)
GNR (GOP number):0 SNR (sector number):0
GNR:1 SNR:6
GNR:2 SNR:10
GNR:3 SNR:16
GNR:4 SNR:19
GNR:5 SNR:23
GNR:6 SNR:28

Note that AOF (audio offset) and AFR (audio frame) are unused (all zeros).

The partial erase operation erases a GOP if all data of the GOP is to be erased but does not erase a GOP if all or some data of the GOP is not to be erased. In the example shown in the top of FIG. 9 in which the partial erase operation is performed on GOP3–GOP4, the partial erase range synchronizes with GOPs. In the example in the bottom of FIG. 9, the partial erase range does not synchronize with GOPs; instead, it ranges from the middle of GOP2 in the 13th sector of the third ECC block to the middle of GOP5 in the 24th of the sixth ECC block. In both cases, GOP3 and GOP4 are erased. Data may or may not actually be erased.

Note that data may or may not actually be erased. And, the erase operation varies according to whether data is actually deleted or not. For an ECC block in which some sectors are actually erased but some are not (for example, the fifth ECC block in FIG. 9), data to be erased is erased and the erased area is filled with stuffing bytes. Then, the ECC is added to the block, which is recorded again. When data is not actually erased, data remains unchanged and the playback operation is performed assuming that the erase operation was performed only on the disc control data. That is, during the playback operation, GOP3 and GOP4 are skipped. In this case, data in the 20th to 22nd sectors in the fifth ECC block remains unchanged. Erased areas after the partial erase operation are treated as if no data was recorded there. They are available for recording overflow data during insert operation. After the partial erase operation, the disc control data is as follows:

GIM (GOP Information Mode)
GNR (GOP number):0 SNR (sector number):0
GNR:1 SNR:6
GNR:2 SNR:10
GNR:3 SNR:23
GNR:4 SNR:28

Note that AOF (audio offset) and AFR (audio frame) are unused (all zeros).

Figure 10:
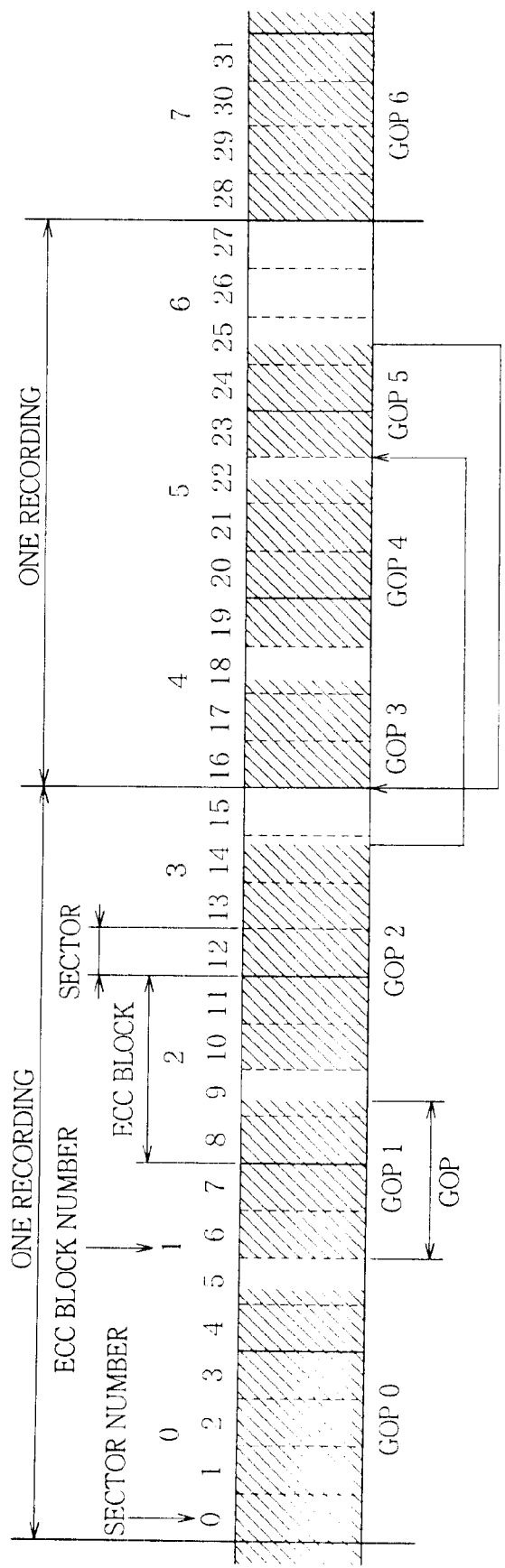
FIG. 10 is a diagram showing recorded data after the partial erase operation.

Next, the merge operation is described. FIG. 10 shows recorded data. In FIG. 10, GOP0–GOP6 were recorded before the merge operation. At this time the disc control data is as follows:

GIM (GOP Information Mode)
GNR (GOP number):0 SNR (sector number):0
GNR:1 SNR:6
GNR:2 SNR:10
GNR:3 SNR:16
GNR:4 SNR:19
GNR:5 SNR:23
GNR:6 SNR:28

Note that AOF (audio offset) and AFR (audio frame) are unused (all zeros).

When merging, or changing playback sequence of, GOPs in the order of GOP0→GOP1→GOP2→GOP5→GOP3→GOP4→GOP6, GOP0 and GOP1 are played back, GOP2 (second and third ECC blocks) is played back, GOP5 (fifth and sixth ECC blocks) is played back, GOP3 (fourth ECC block) is played back, GOP4 (fourth and fifth ECC blocks) is played back, and then GOP6 is played back.

The disc control data is set up as follows:
GIM (GOP Information Mode)
GNR (GOP number):0 SNR (sector number):0
GNR:1 SNR:6
GNR:2 SNR:10
GNR:3 SNR:16
GNR:4 SNR:19
GNR:5 SNR:23
GNR:6 SNR:28
GMM (GOP merge mode) IGN (Insertion destination GOP number):2
ENG (Number of GOPs to be merged):1
EGS (Insertion start GOP number):5

Note that AOF (audio offset) and AFR (audio frame) are unused (all zeros).

The disc control data as described above indicates that one GOP beginning with GOP5 is inserted after GOP2.

Figure 11:
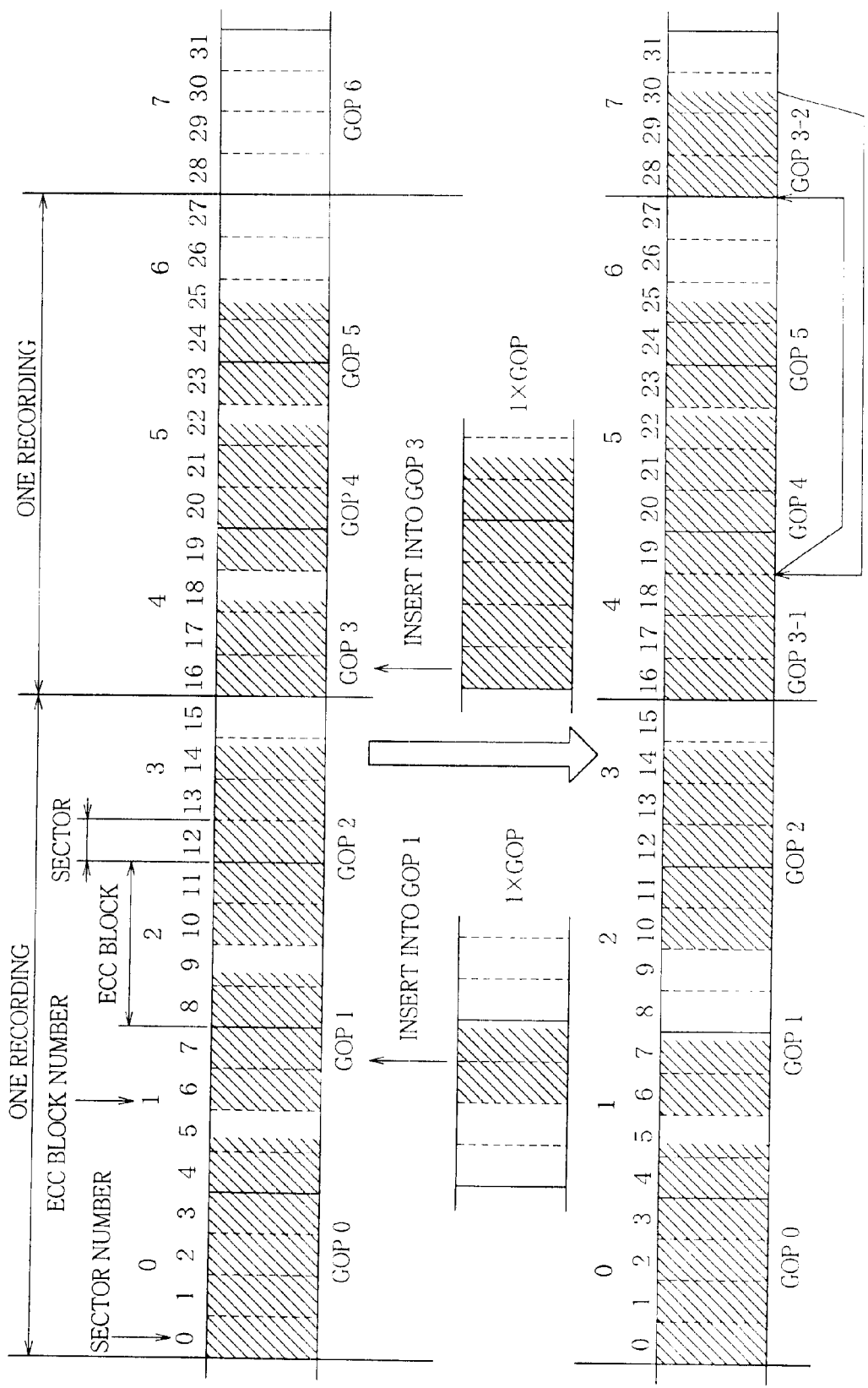
FIG. 11 is a diagram showing recorded data after the insert operation when the number of inserted GOPs is equal to the number of original GOPs.
Figure 12:
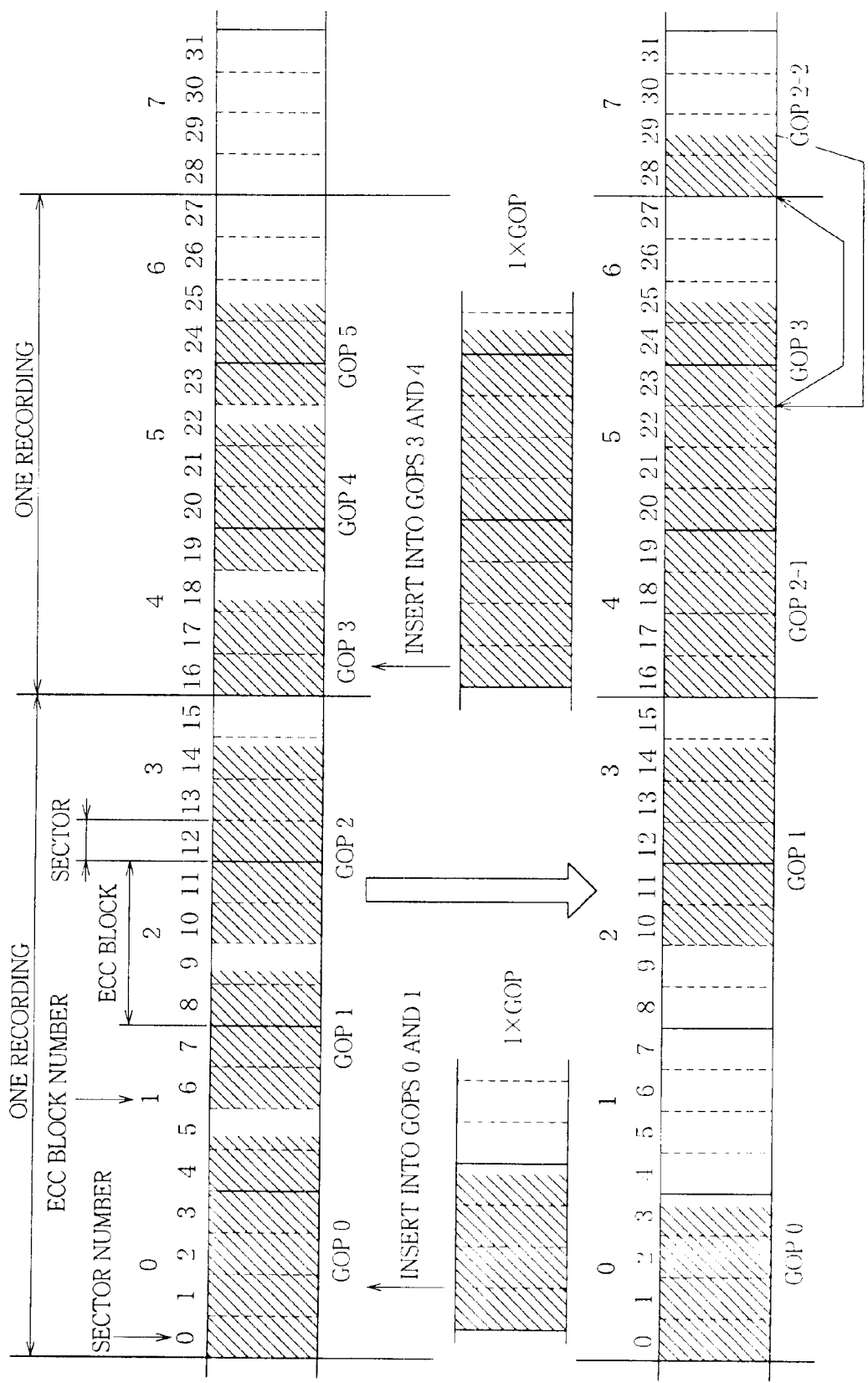
FIG. 12 is a diagram showing recorded data after the insert operation when the number of inserted GOPs is less than the number of original GOPs.
Figure 13:
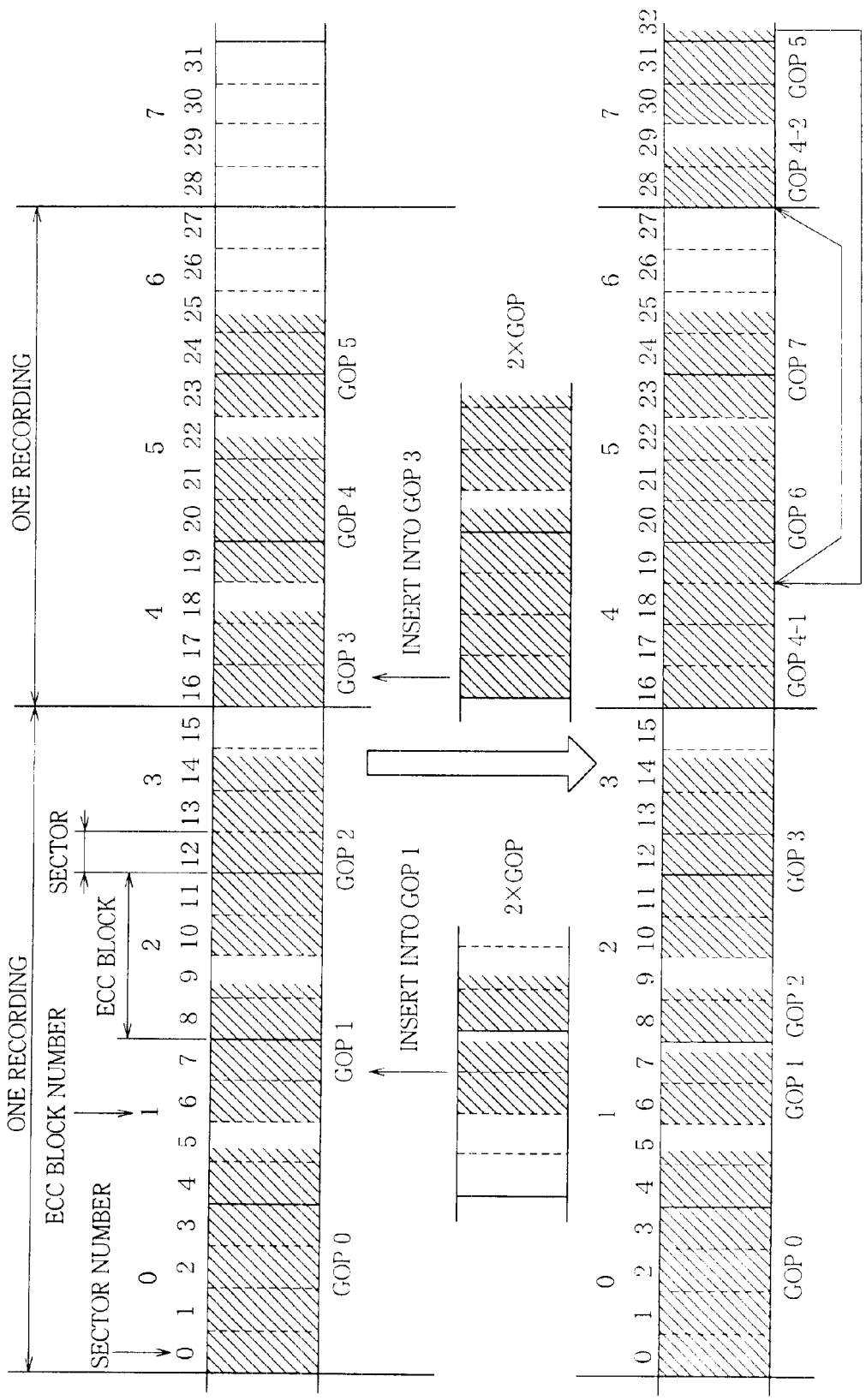
FIG. 13 is a diagram showing recorded data after the insert operation when the number of inserted GOPs is more than the number of original GOPs.

Next, the insert operation is described. FIG. 11 shows recorded data when the number of GOPs to be inserted is equal to the number of destination GOPs. FIG. 12 shows recorded data when the number of GOPs to be inserted is less than the number of destination GOPs. FIG. 13 shows recorded data when the number of GOPs to be inserted is more than the number of destination GOPs. In FIGS. 11–13, GOP0 to GOP5 are recorded and the disc control data is as follows:

GIM (GOP Information Mode)
GNR (GOP number):0 SNR (sector number):0
GNR:1 SNR:6
GNR:2 SNR:10
GNR:3 SNR:16
GNR:4 SNR:19

GNR:5 SNR:23

Note that AOF (audio offset) and AFR (audio frame) are unused (all zeros).

When the number of GOPs to be inserted is equal to the number of destination GOPs (FIG. 11):

When the coding amount of the GOPs to be inserted is smaller than that of the destination GOPs, the remaining bytes in the destination GOPs are filled with stuffing bytes after the insertion operation. In this example, new data is inserted into GOP1. In this case, data is recorded into sectors 6 and 7; the remaining part of sector 7 and sectors 8 and 9 are filled with stuffing bytes. A blank area of one or more ECC blocks, if created as a result of insertion, is available for use in recording overflow data which will be generated during insertion. This applies to FIGS. 12 and 13.

When the coding amount of the GOPs to be inserted is larger than that of the destination GOPs, the destination GOPs are filled with data and the rest of data is written in an unused area. The remaining part of the ECC block is filled with stuffing bytes. In this example, GOP3 is divided into two. The first half, GOP3-1, is recorded in sectors 16–18 of the fourth ECC block, while the second half, GOP3-2, is recorded in sectors 28–30 of the seventh ECC block. Sectors 30 and 31, which are the remaining part of the seventh ECC block, are filled with stuffing bytes.

The disc control data is set up as follows:
GIM (GOP Information Mode)
GNR (GOP number):0 SNR (sector number):0
GNR:1 SNR:6
GNR:2 SNR:10
GNR:3 SNR:16
GNR:4 SNR:19
GNR:5 SNR:23
EJP (Edit jump information mode) ISN (Insertion destination sector number):18
EEN (Number of ECC blocks to be inserted):1
ESE (Insertion start ECC block number):7

Note that AOF (audio offset) and AFR (audio frame) are unused (all zeros).

The disc control data described above indicates that one ECC block beginning with ECC block 7 is inserted after sector 18.

When the number of GOPs to be inserted is less than the number of destination GOPs (FIG. 12):

When the coding amount of the GOPs to be inserted is smaller than that of the destination GOPS, the remaining bytes in the destination GOP are filled with stuffing bytes after the insertion operation. In this example, data is inserted as in GOP0.

When the coding amount of the GOPs to be inserted is larger than that of the destination GOPs, the destination GOPs are filled with data and the rest of data is written in an unused area. The remaining part of the ECC block is filled with stuffing bytes. In this example, GOP2 is divided into two. The first half, GOP2-1, is recorded in sectors 16 of the fourth ECC block to sector 22 of the fifth ECC block, while the second half, GOP2-2, is recorded in sectors 28–29 of the seventh ECC block.

The disc control data is set up as follows:
GIM (GOP Information Mode)
GNR (GOP number):0 SNR (sector number):0
GNR:1 SNR:10
GNR:2 SNR:16
GNR:3 SNR:23
EJP (Edit jump information mode) ISN (Insertion destination sector number):22
EEN (Number of ECC blocks to be inserted):1
ESE (Insertion start ECC block number):7

Note that AOF (audio offset) and AFR (audio frame) are unused (all zeros).

The disc control data described above indicates that one ECC block beginning with ECC block 7 is inserted after sector 22.

When the number of GOPs to be inserted is more than the number of destination GOPs (FIG. 13):

When the coding amount of the GOPs to be inserted is smaller than that of the destination GOPs, the remaining bytes in the destination GOPs are filled with stuffing bytes after the insertion operation. In this example, data is inserted as in GOP1 and GOP2.

When the coding amount of the GOPs to be inserted is larger than that of the destination GOPs, the destination GOPs are filled with data and the rest of data is written in an unused area. The remaining part of the ECC block is filled with stuffing bytes. In this example, GOP4 is divided into two. The first half, GOP4-1, is recorded in sectors 16–18 of the fourth ECC block, the second half, GOP4-2, is recorded in sectors 28–29 of the seventh ECC block, and GOP5 is recorded into sector 30 of the seventh ECC block to sector 32 of the eighth ECC block.

The disc control data is set up as follows:
GIM (GOP Information Mode)
GNR (GOP number):0 SNR (sector number):0
GNR:1 SNR:6
GNR:2 SNR:8
GNR:3 SNR:10
GNR:4 SNR:16
GNR:5 SNR:30
GNR:7 SNR:23
EJP (Edit jump information mode) ISN (Insertion destination sector number): 18
EEN (Number of ECC blocks to be inserted):2
ESE (Insertion ECC start block number):7

Note that AOF (audio offset) and AFR (audio frame) are unused (all zeros).

The disc control data described above indicates that two ECC blocks beginning with ECC block 7 are inserted after sector 18.

In the above description, only video data is processed or video data and audio data are processed at the same time. The following describes how video data and audio data are processed separately.

Video data compressed by MPEG-2 is processed in GOPs. Because one GOP consists of 15 frames, one GOP is 2/1.001 Hz in countries, such as Japan and U.S., in which the NTSC (National Television System Committee) system is used. On the other hand, audio data is processed in audio frames. In layer 2 of MPEG-1, an audio frame is, in general, 125/3 Hz. Thus, there is no integral relationship between video GOPs and audio frames.

Therefore, video data is coded in GOPs and audio data is coded in audio frames. And, when the number of bits of coded audio data reaches the number of bits of an ECC block (32 Kbytes), one ECC block of audio data is inserted as an audio ECC block. This means that an audio ECC block is inserted between two continuous video ECC blocks and that audio data logically continues across separate audio ECC blocks.

An audio ECC block aligns on the leftmost position of an audio frame. That is, an ECC block is filled with audio frame data and, when the last audio frame data extends across two ECC blocks, the last audio frame is written not in that ECC block but in the next ECC block. The remaining part of the ECC block is filled with stuffing bytes.

Figure 14:
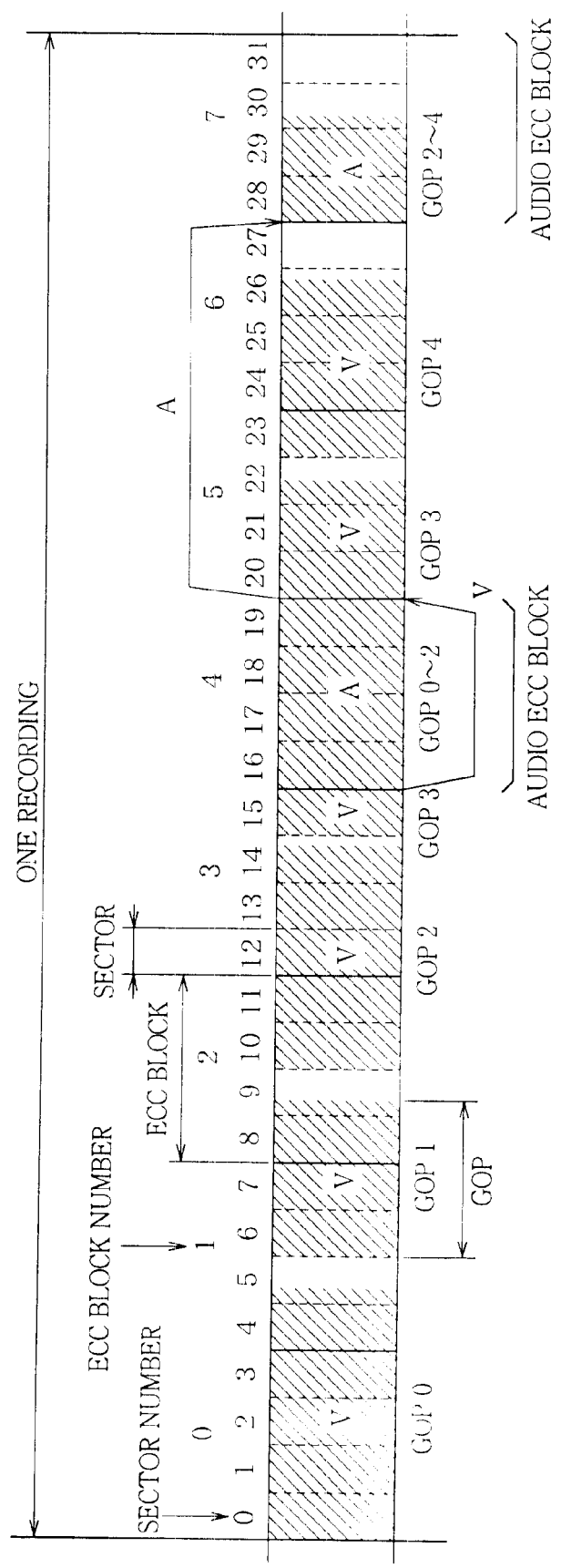
FIG. 14 is a diagram showing an example of arrangement of video GOPs and audio frames.
Figure 15:
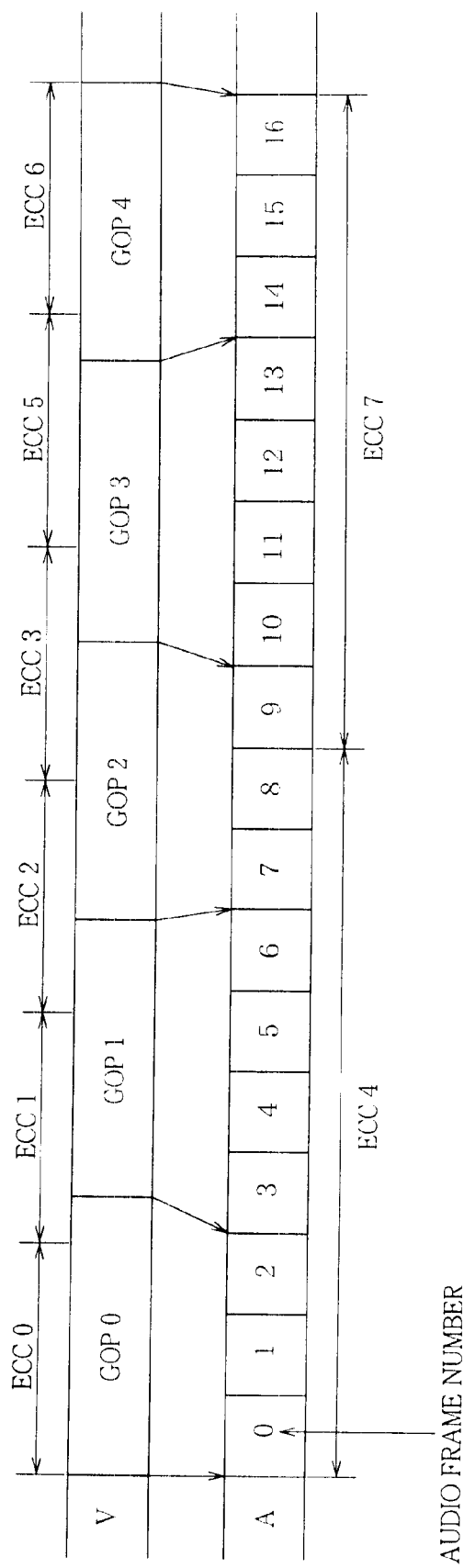
FIG. 15 is a diagram showing the relation between the video GOPs and audio frames shown in FIG. 14.

FIG. 14 shows how video GOPs and audio frames are arranged. FIG. 15 shows that video GOPs and audio frames shown in FIG. 14 are asynchronous. In FIG. 15, the horizontal axis represents time. In FIG. 14, video GOP0 to video GOP4 are in the 0th to third ECC blocks and in the fifth to sixth ECC blocks; audio data corresponding to GOP1 to an intermediate point in GOP2 is in audio frames 0–8 of the fourth ECC block, and audio data corresponding the intermediate position in GOP2 to GOP4 are in audio frames 9–16 of the seventh ECC block. In this example, GOP0 corresponds to audio frames 0–2, GOP1 to audio frames 3–6, GOP2 to audio frames 7–9, GOP3 to audio frames 10–13, and GOP4 to audio frames 14–16. In FIG. 15, although GOPs 1, 2, 3, and 4 do not coincide with audio frames 3, 7, 10, and 14, respectively, their differences are assumed to be so small that they may be ignored for convenience.

The disc data is set up as follows:
GIM (GOP Information Mode)

| GOP number | Audio offset | Audio frame Number | Sector number |
|---|---|---|---|
| GNR:0 | AOF:0 | AFR:0 | SNR:0 |
| GNR:1 | AOF:0 | AFR:3 | SNR:6 |
| GNR:2 | AOF:0 | AFR:7 | SNR:10 |
| GNR:3 | AOF:1 | AFR:1 | SNR:15 |
| GNR:4 | AOF:0 | AFR:5 | SNR:23 |

The above control data indicates the following. For example, GOP3 starts at sector 15, and the synchronizing audio data (AOF:1, AFR:1) starts in the second audio ECC block from sector 15 (that is, the seventh ECC block) and at audio frame 2 (that is, audio frame 10).

The add operation, after-specified-point erase operation, partial erase operation, and merge operation are done as described in FIGS. 7, 8, 9, and 10. The detailed description is omitted here.

The following describes the split editing operation and the after recording operation in which only audio data is added after video data is recorded.

Figure 16:
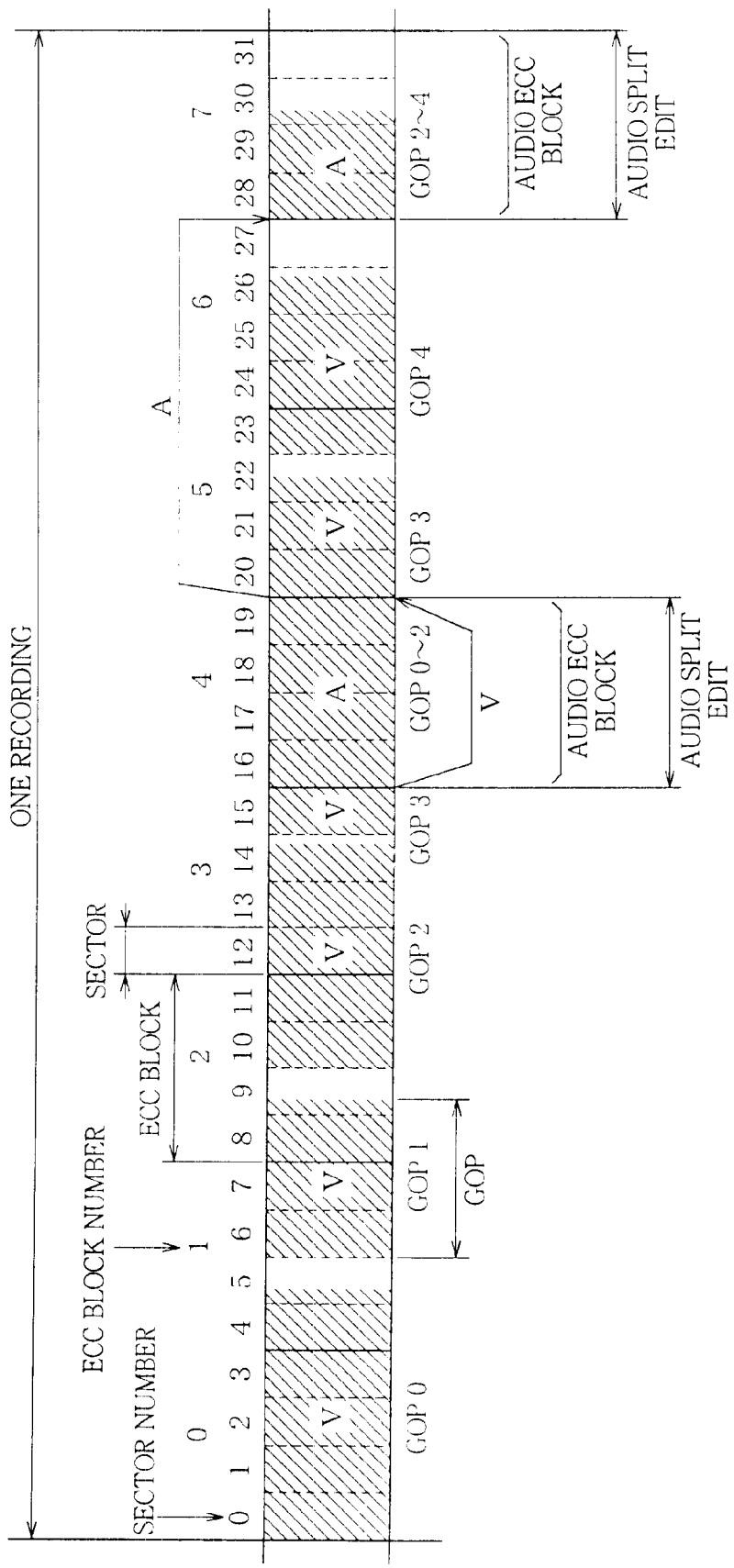
FIG. 16 is a diagram showing recorded data after the video/audio split editing operation and the audio after-recording operation.

FIG. 16 shows recorded data. Because the coding amount of one audio frame is fixed, the coding amount is not increased during audio split editing or the after recording operation with no overflow to another area. Thus, the ECC block containing the audio frames corresponding to the GOPs for which the split editing operation is to be performed are read, editing is performed, the ECC is added, and then all data is recorded again. In the example, the fourth and seventh ECC blocks are edited. The disc control data remains unchanged. The disc control data is as follows:
GIM (GOP Information Mode)

| GOP number | Audio offset | Audio frame Number | Sector number |
|---|---|---|---|
| GNR:0 | AOF:0 | AFR:0 | SNR:0 |
| GNR:1 | AOF:0 | AFR:3 | SNR:6 |
| GNR:2 | AOF:0 | AFR:7 | SNR:10 |
| GNR:3 | AOF:1 | AFR:1 | SNR:15 |
| GNR:4 | AOF:0 | AFR:5 | SNR:23 |

Figure 17:
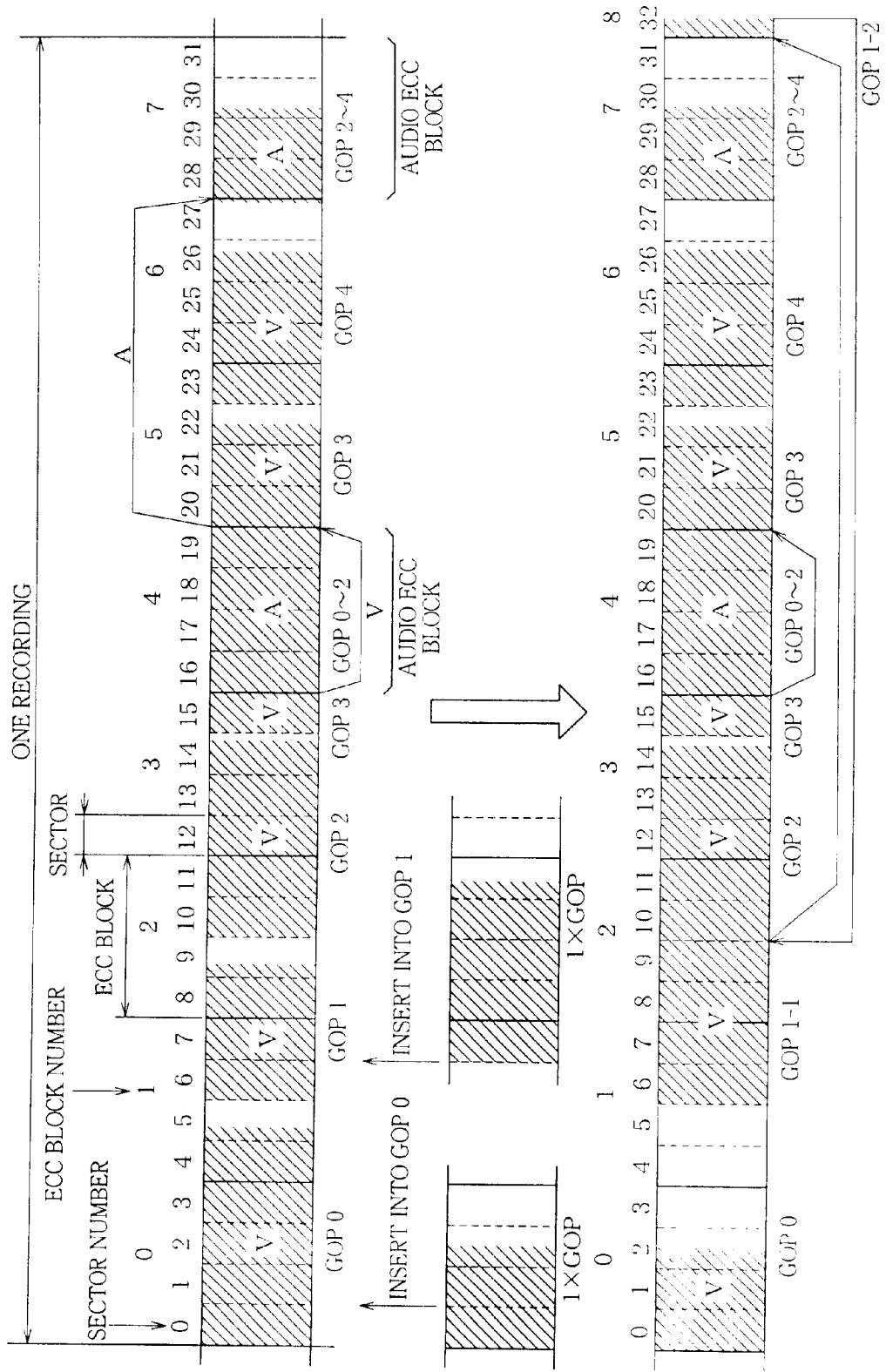
FIG. 17 is a diagram showing recorded data after the video/audio insert operation when the number of inserted GOPs is equal to the number of original GOPs.
Figure 18:
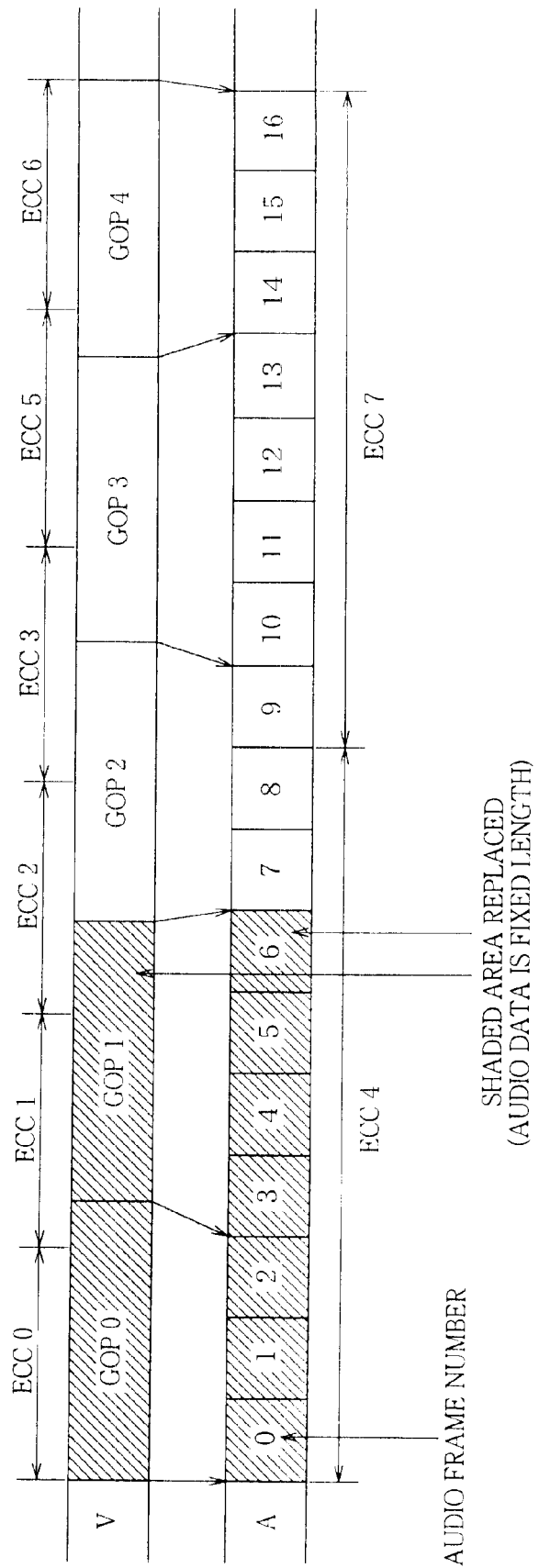
FIG. 18 is a diagram showing the relation between the video GOPs and audio frames during the video/audio insert operation when the number of inserted GOPs is equal to the number of original GOPs.
Figure 19:
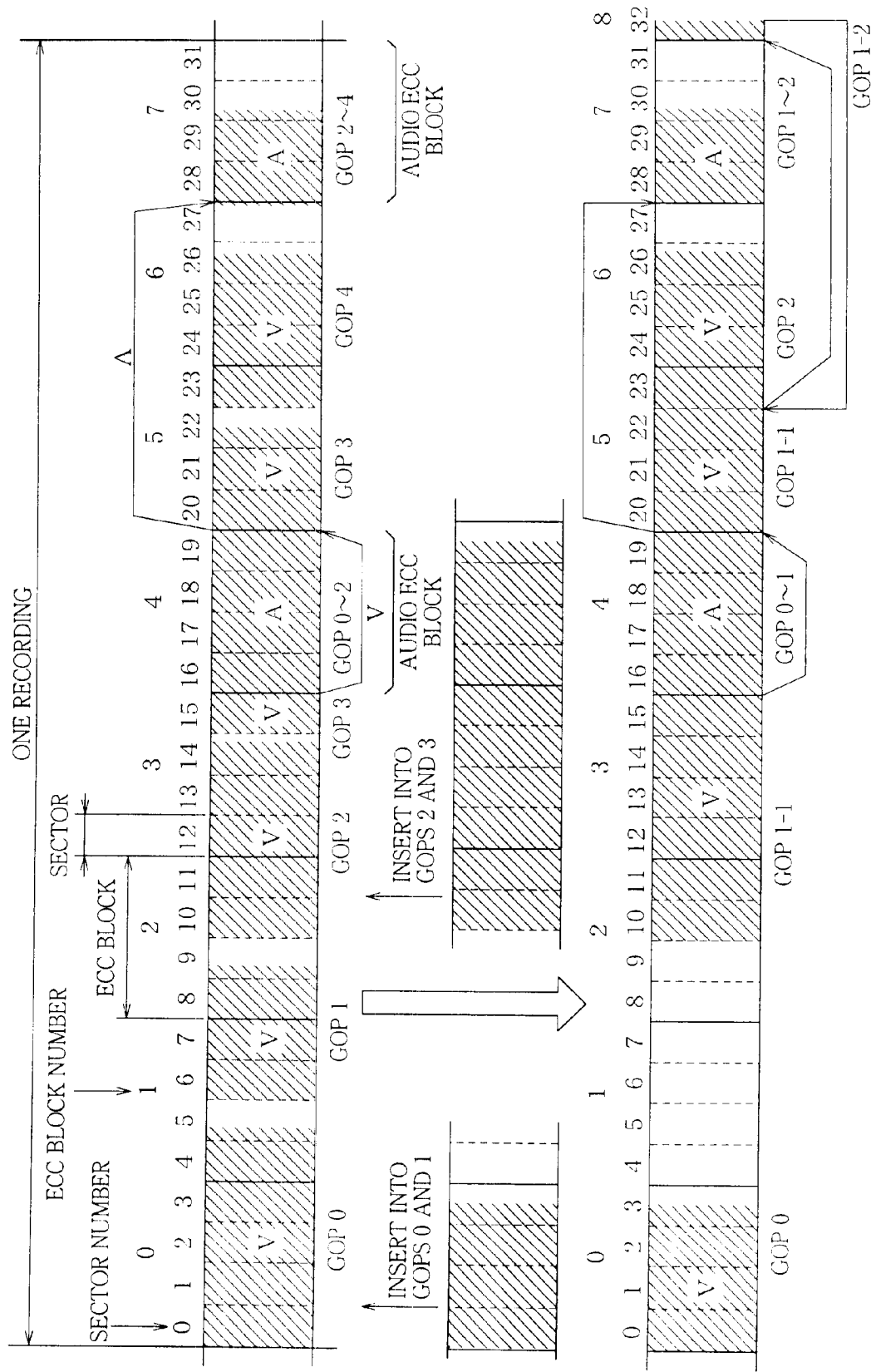
FIG. 19 is a diagram showing recorded data after the video/audio insert operation when the number of inserted GOPs is less than the number of original GOPs.
Figure 20:
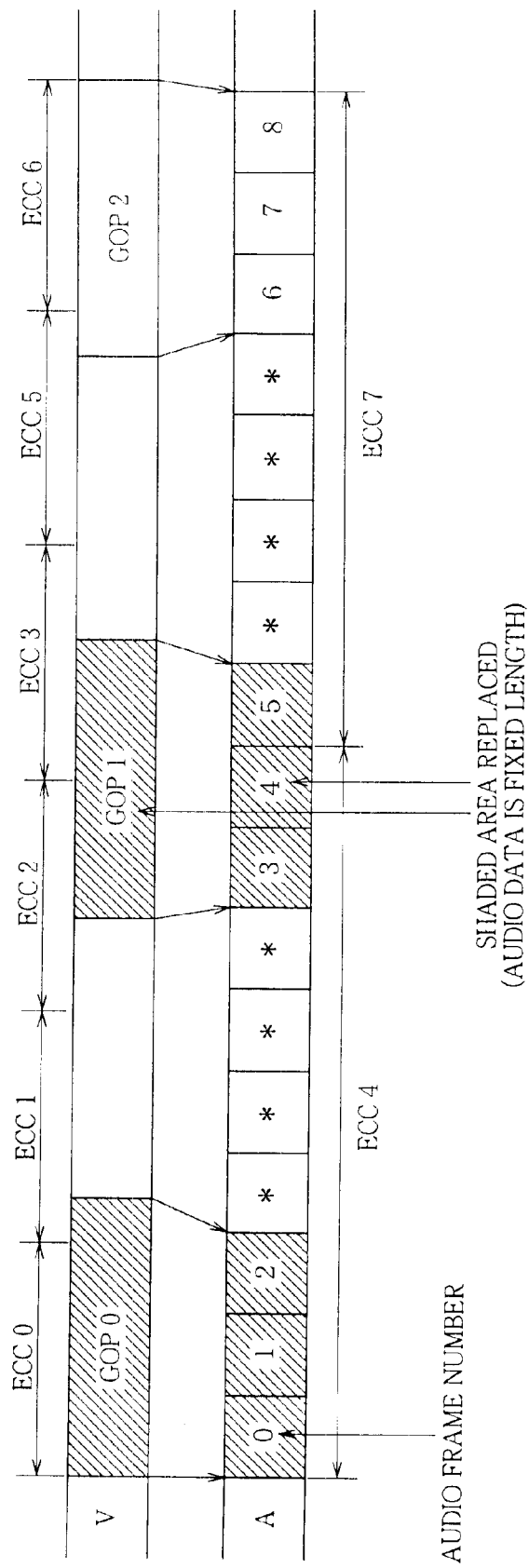
FIG. 20 is a diagram showing the relation between the video GOPs and audio frames during the video/audio insert operation when the number of inserted GOPs is less than the number of original GOPS.
Figure 21:
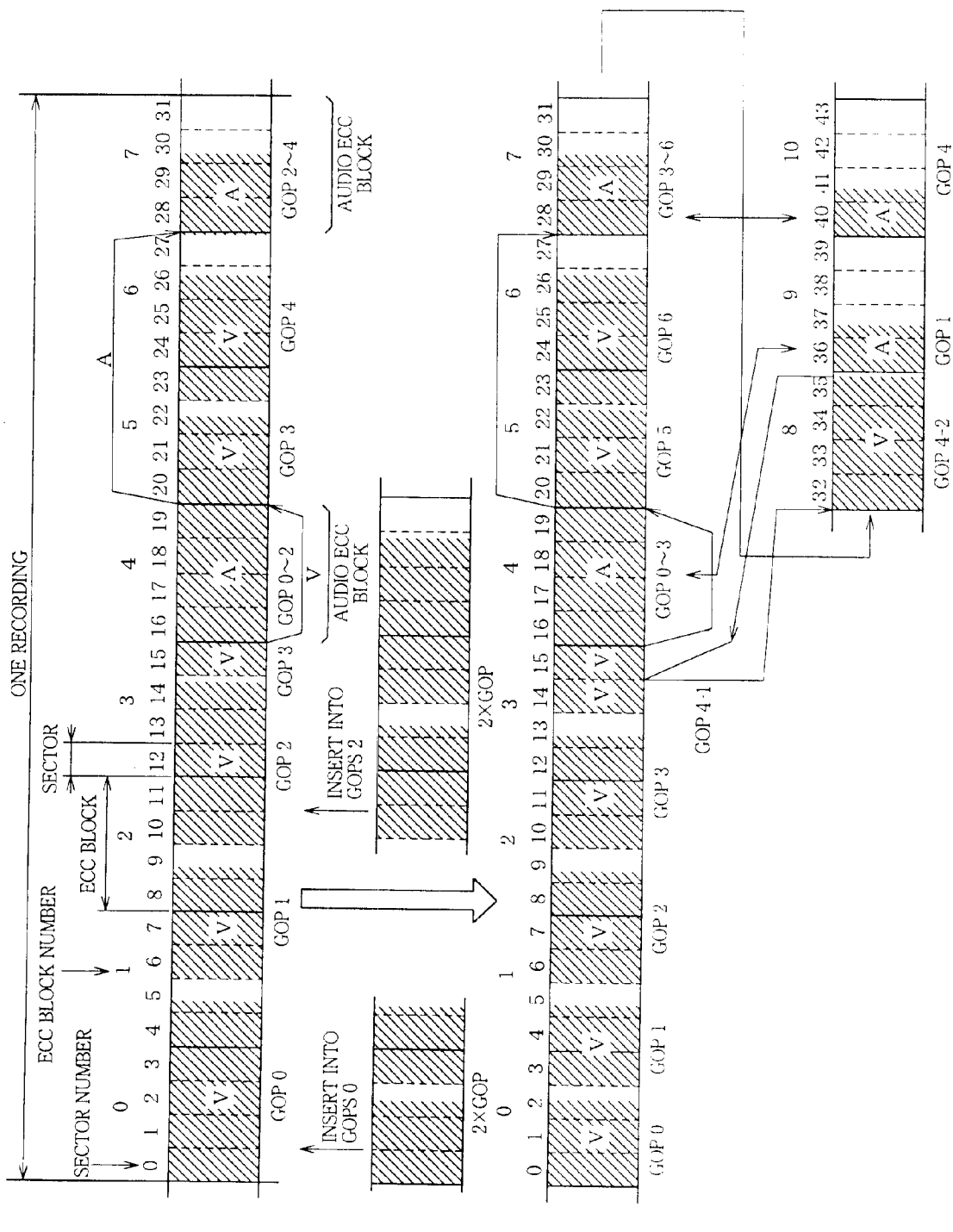
FIG. 21 is a diagram showing recorded data after the video/audio insert operation when the number of inserted GOPs is more than the number of original GOPs.
Figure 22:
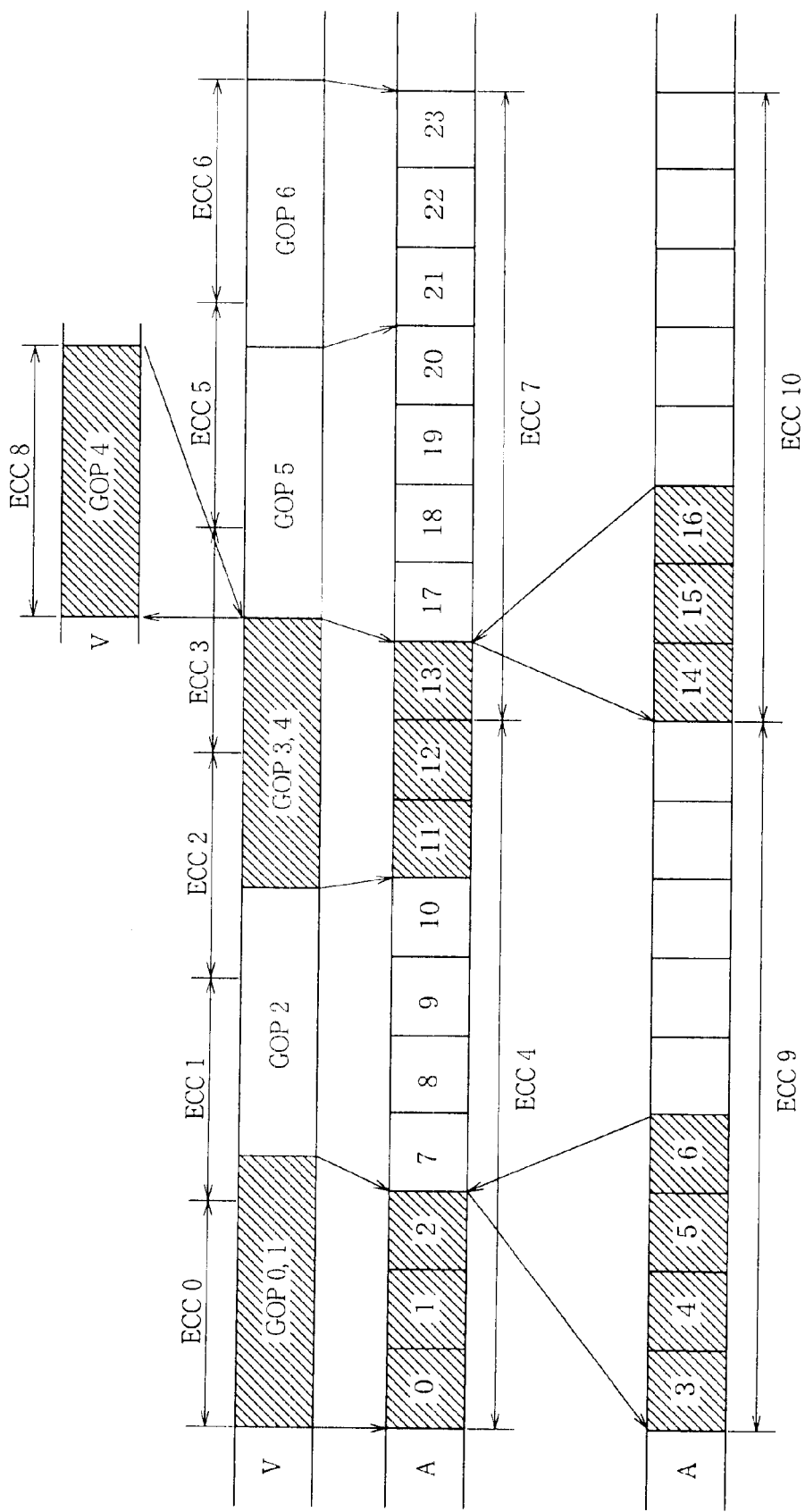
FIG. 22 is a diagram showing the relation between the video GOPs and audio frames during the video/audio insert operation when the number of inserted GOPs is more than the number of original GOPs.

Next, the video/audio insert operation is described. FIG. 17 shows recorded data when the number of GOPs to be inserted is equal to the number of destination GOPs. FIG. 18 shows the relation between video GOPs and audio frames. FIG. 19 shows recorded data when the number of GOPs to be inserted is less than the number of destination GOPs. FIG. 20 shows the relation between video GOPs and audio frames. FIG. 21 shows recorded data when the number of GOPs to be inserted is more than the number of destination GOPs. FIG. 22 shows the relation between video GOPs and audio frames. In FIGS. 17–22, GOP0 to GOP4 are recorded and the disc control data is as follows:
GIM (GOP Information Mode)

| GOP number | Audio offset | Audio frame Number | Sector number |
|---|---|---|---|
| GNR:0 | AOF:0 | AFR:0 | SNR:0 |
| GNR:1 | AOF:0 | AFR:3 | SNR:6 |
| GNR:2 | AOF:0 | AFR:7 | SNR:10 |
| GNR:3 | AOF:1 | AFR:1 | SNR:15 |
| GNR:4 | AOF:0 | AFR:5 | SNR:23 |

When the number of GOPs to be inserted is equal to the number of destination GOPs (FIGS. 17 and 18):

When the coding amount of the GOPs to be inserted is smaller than that of the destination GOPs, the remaining bytes in the destination GOPs are filled with stuffing bytes after the insertion operation. In this example, new data is inserted into GOP0. A blank area of one or more ECC blocks, if created as a result of insertion, is available for use in recording overflow data which will be generated during insertion. This applies to FIGS. 19 and 21.

When the coding amount of the GOPs to be inserted is larger than that of the destination GOPs, the destination GOPs are filled with data and the rest of data is written in an unused area. The remaining part of the ECC block is filled with stuffing bytes. In this example, GOP1 is divided into two. The first half, GOP1-1, is recorded in from sector 6 of the first ECC block to sector 9 of the second ECC block, while the second half, GOP1-2, is recorded in sector 32 of the eighth ECC block.

Because an audio frame is fixed length, data is re-written in its place. In this example, audio frames 0–2 corresponding to GOP0 of the fourth ECC block and audio frames 3–6 corresponding to GOP1 are re-written. In practice, audio frames 0–6 of the fourth ECC block are re-written, the ECC is added again, and the fourth ECC block is recorded again. In FIG. 18, the parts of video data (V) and audio data (A) to be re-written are indicated by shading.

The disc control data is as follows:
GIM (GOP Information Mode)

| GOP number | Audio offset | Audio frame Number | Sector number |
|---|---|---|---|
| GNR:0 | AOF:0 | AFR:0 | SNR:0 |
| GNR:1 | AOF:0 | AFR:3 | SNR:6 |
| GNR:2 | AOF:0 | AFR:7 | SNR:10 |
| GNR:3 | AOF:1 | AFR:1 | SNR:15 |
| GNR:4 | AOF:0 | AFR:5 | SNR:23 |

EJP (Edit jump information mode) ISN (Destination sector number):9
EEN (Number of ECC blocks to be inserted)
ESE (Insert start ECC block number):8

When the number of GOPs to be inserted is less than the number of destination GOPs (FIGS. 19 and 20):

When the coding amount of the GOPs to be inserted is smaller than that of the destination GOPs, the remaining bytes in the destination GOP are filled with stuffing bytes after the insertion operation. In this example, data is inserted as in GOP0.

When the coding amount of the GOPs to be inserted is larger than that of the destination GOPs, the destination GOPs are filled with data and the rest of data is written in an unused area. The remaining part of the ECC block is filled with stuffing bytes. In this example, GOP1 is divided into two. The first half, GOP1-1, is recorded in from sector 10 of the second ECC block to sector 15 of the third ECC block and in sectors 20–22 of the fifth ECC block, while the second half, GOP1-2, is recorded in sector 32 of the eighth ECC block.

Because an audio frame is fixed length, data is re-written in its place. In this example, audio frames 0–2 corresponding to GOP0 of the fourth ECC block, audio frames 3–4 corresponding to GOP1, and audio frame 5 corresponding to GOP1 of the seventh ECC block are re-written. In practice, audio frames 0–2 and 3–4 of the fourth ECC block and audio frame 5 of the seventh ECC block are re-written, the ECC is added again, and the fourth and seventh ECC block are recorded again. In FIG. 20, the parts of video data (V) and audio data (A) to be re-written are indicated by shading.

In the fourth and seventh ECC blocks, the audio frames with no number assigned (audio frames indicated by * in the figure) may or may not be erased. Whether they are erased or not, the fourth and seventh ECC blocks are recorded again because of the reason described above. When they are erased, a frame indicated by * is not counted as the audio frame number AFR; when they are not erased, a frame indicated by * is counted as the audio frame number AFR. This applies also to the erase operation.

The disc control data is as follows:
GIM (GOP Information Mode)
Frames indicated by * are erased:

| GOP number | Audio offset | Audio frame Number | Sector number |
|---|---|---|---|
| GNR:0 | AOF:0 | AFR:0 | SNR:0 |
| GNR:1 | AOF:0 | AFR:3 | SNR:10 |
| GNR:2 | AOF:0 | AFR:1 | SNR:23 |

Frames indicated by * are not erased:

| GOP number | Audio offset | Audio frame Number | Sector number |
|---|---|---|---|
| GNR:0 | AOF:0 | AFR:0 | SNR:0 |
| GNR:1 | AOF:0 | AFR:7 | SNR:10 |
| GNR:2 | AOF:0 | AFR:5 | SNR:23 |

EJP (Edit jump information mode) ISN (Insertion destination sector number): 22
EEN (Number of ECC blocks to be inserted):1
ESE (Insertion start ECC block number):8

When the number of GOPs to be inserted is more than the number of destination GOPs (FIGS. 21 and 22):

When the coding amount of the GOPs to be inserted is smaller than that of the destination GOPs, the remaining bytes in the destination GOPs are filled with stuffing bytes after the insertion operation. In this example, data is inserted as in GOP1 and GOP2.

When the coding amount of the GOPs to be inserted is larger than that of the destination GOPs, the destination GOPs are filled with data and the rest of data is written in an unused area. The remaining part of the ECC block is filled with stuffing bytes. In this example, GOP3 is recorded in from sector 10 of the second ECC block to sector 13 of the third ECC block. GOP4 is divided into two. The first half, GOP4-1, is recorded in sector 14 of the third ECC block, the second half, GOP4-2, is recorded in sectors 32–35 of the eighth ECC block.

Because the number of audio frames increases, they are recorded in unused ECC block. In this example, after audio frames 0–2 corresponding to GOP0 of the fourth ECC block are re-written, audio frames 3–6 corresponding to GOP1 are added. However, the fourth ECC block has no free space, the audio frames are added to the ninth ECC block. For the audio frames corresponding to GOP2, the recorded data is used. In addition, after audio frames 11–12 corresponding to GOP3 of the fourth ECC block and audio frame 13 corresponding to GOP3 are re-written, audio frames 14–16 corresponding to GOP4 are added. However, the seventh ECC block has no free space, the audio frames are added to the tenth ECC block. For the audio frames corresponding to GOPs 5 and 6, the recorded data is used. For the fourth and seventh ECC blocks which were re-written, the ECC is added again and the entire blocks are recorded again. In FIG. 22, the parts of video data (V) and audio data (A) to be re-written are indicated by shading.

Two types of disc control data, (1) and (2), are possible. Either one may be used. In (1), the added ECC blocks are a part of the original ECC blocks; in (2), the added ECC blocks are independent ECC blocks.

GIM (GOP Information Mode)
(1)

| GOP number | Audio offset | Audio frame Number | Sector number |
|---|---|---|---|
| GNR:0 | AOF:0 | AFR:0 | SNR:0 |
| GNR:1 | AOF:0 | AFR:3 | SNR:3 |
| GNR:2 | AOF:0 | AFR:7 | SNR:6 |
| GNR:3 | AOF:0 | AFR:11 | SNR:10 |
| GNR:4 | AOF:1 | AFR:1 | SNR:14 |
| GNR:5 | AOF:1 | AFR:4 | SNR:15 |
| GNR:6 | AOF:0 | AFR:8 | SNR:23 |

(2)

| GOP number | Audio offset | Audio frame Number | Sector number |
|---|---|---|---|
| GNR:0 | AOF:0 | AFR:0 | SNR:0 |
| GNR:1 | AOF:2 | AFR:0 | SNR:3 |
| GNR:2 | AOF:0 | AFR:3 | SNR:6 |
| GNR:3 | AOF:0 | AFR:7 | SNR:10 |
| GNR:4 | AOF:3 | AFR:0 | SNR:14 |
| GNR:5 | AOF:1 | AFR:1 | SNR:15 |
| GNR:6 | AOF:0 | AFR:5 | SNR:23 |

EJP (Edit jump information mode) ISN (Insertion destination sector number):14
EEN (Number of ECC blocks to be inserted):1
ESE (Insertion start ECC block number):8
AJP (Audio jump information mode) IAE (Insertion destination ECC block number):4 IAE:7
IAF (Insertion destination frame number):2 IAF:1
NAF (Number of audio frames to be inserted):4 NAF:3
AEN (Insertion ECC block number) 9 AEN:10

AJP (Audio Jump Information Mode) inserts 4 frames, beginning with the start of the ninth ECC block, after audio frame 2 of the fourth ECC block, and 3 audio frames, beginning with the start of the tenth ECC block, after audio frame 1 of the seventh ECC block.

Figure 23:
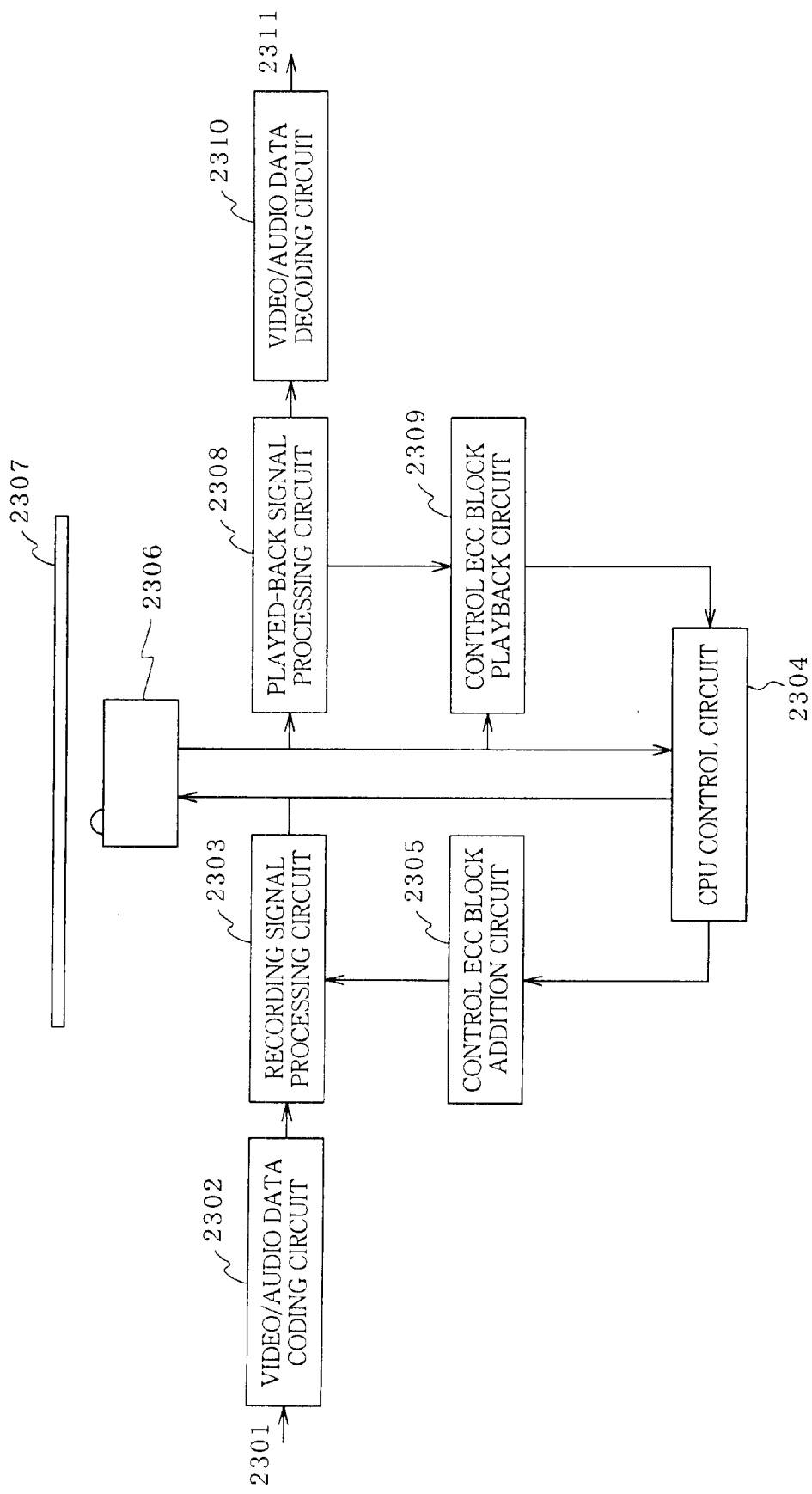
FIG. 23 is a diagram showing the block configuration of the unit according to the present invention.
Figure 24:
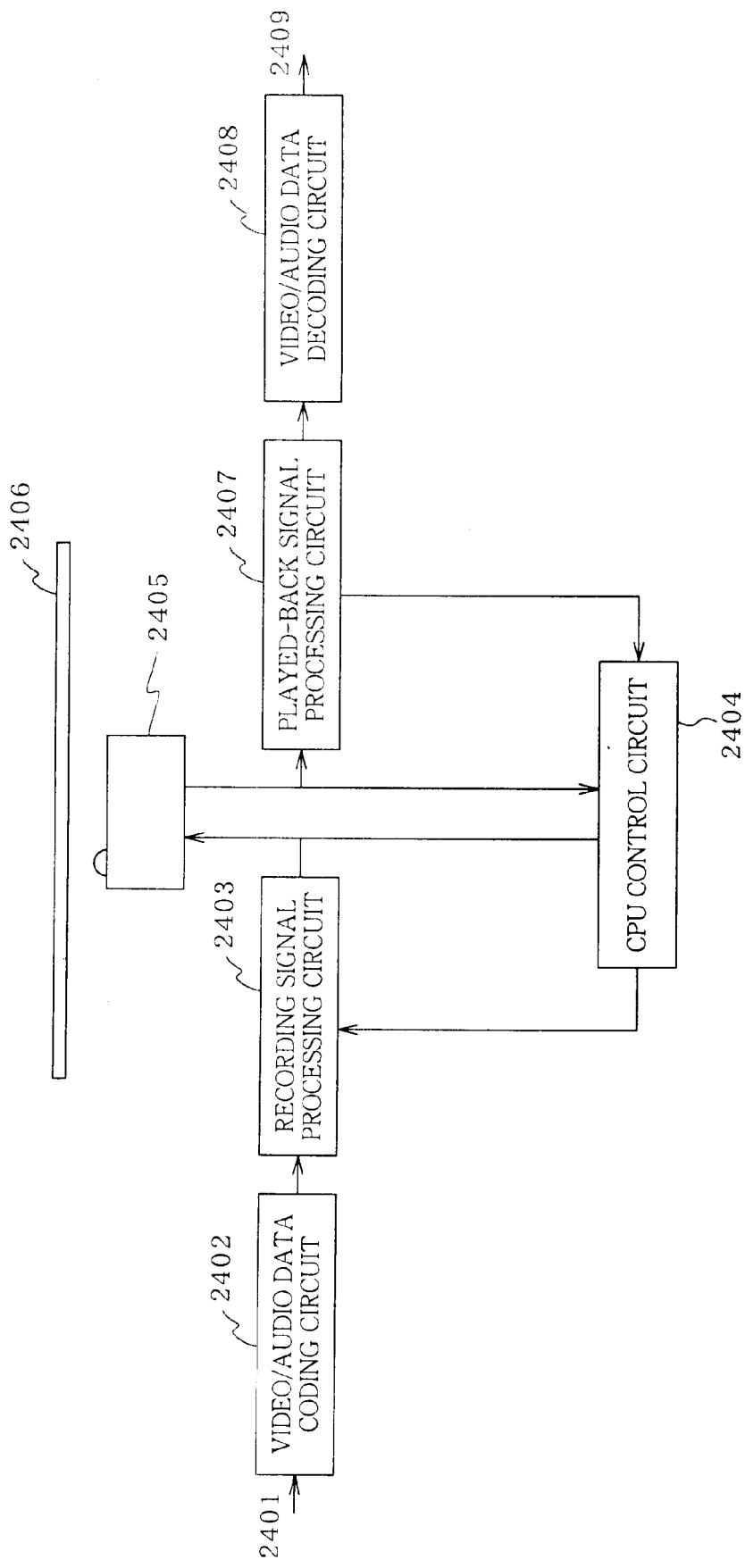
FIG. 24 is a diagram showing an example of the block configuration of a unit (DVD-RAM) according to the prior art.

FIG. 23 shows an example of a unit which records control ECC blocks described above.

Figure 25:
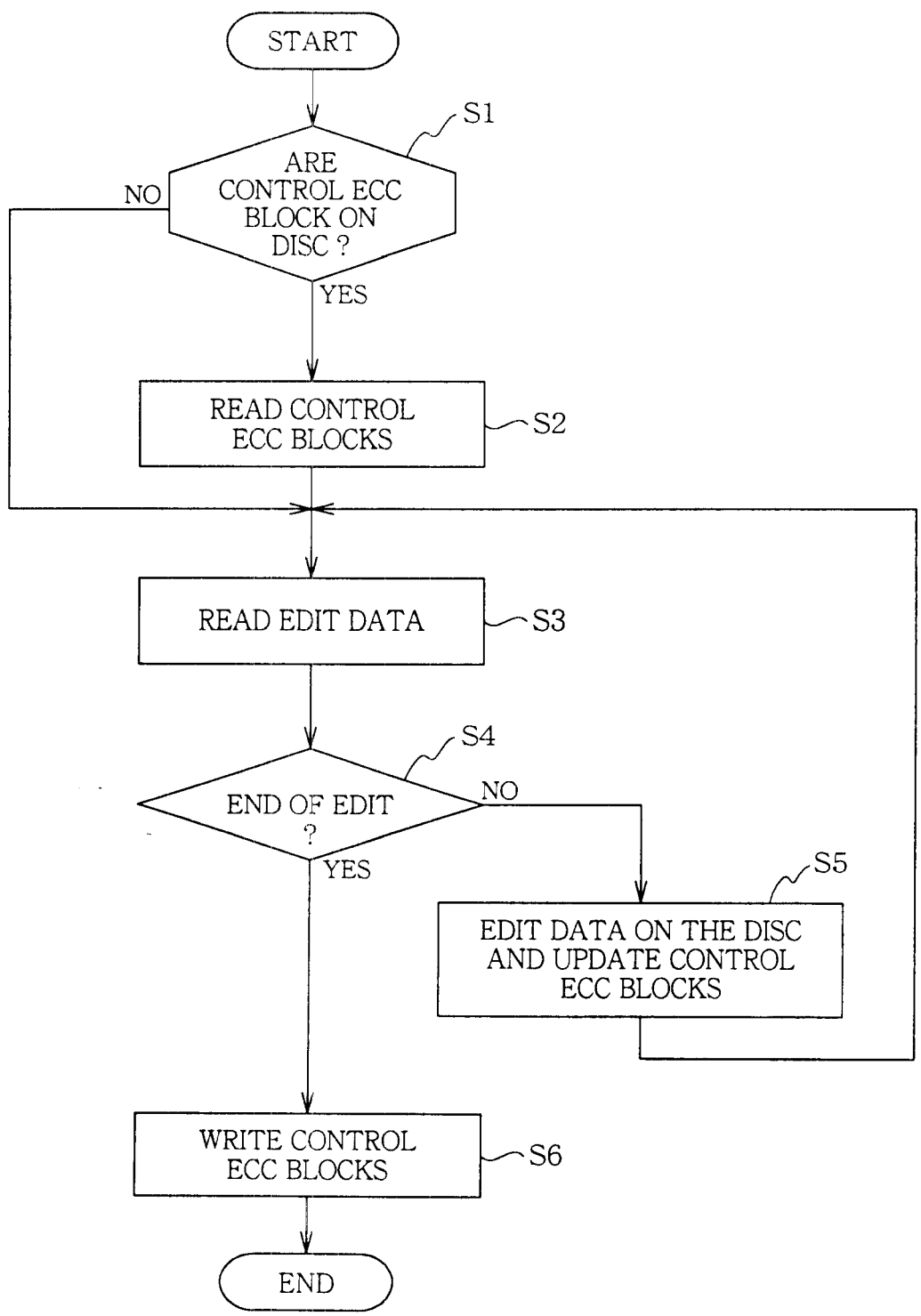
FIG. 25 is a flowchart showing the outline of how data is edited and recorded according to the present invention.

At recording time, a video/audio data coding circuit 2302 receives video/audio signals 2301 and compresses and multiplexes them into a stream. A recording signal processing circuit 2303 shuffles the stream, adds ECCs, and codes it for recording. A CPU control circuit 2304 controls a control ECC block addition circuit 2305 to generate control ECC blocks and sends them to the recording signal processing circuit 2303. At the same time, the CPU control circuit 2304 controls the optical head and the spindle motor. The data is written onto a disc 2307 by the optical head 2306. And, after editing, the control ECC blocks are written. FIG. 25 shows an example of recording process.

Figure 26:
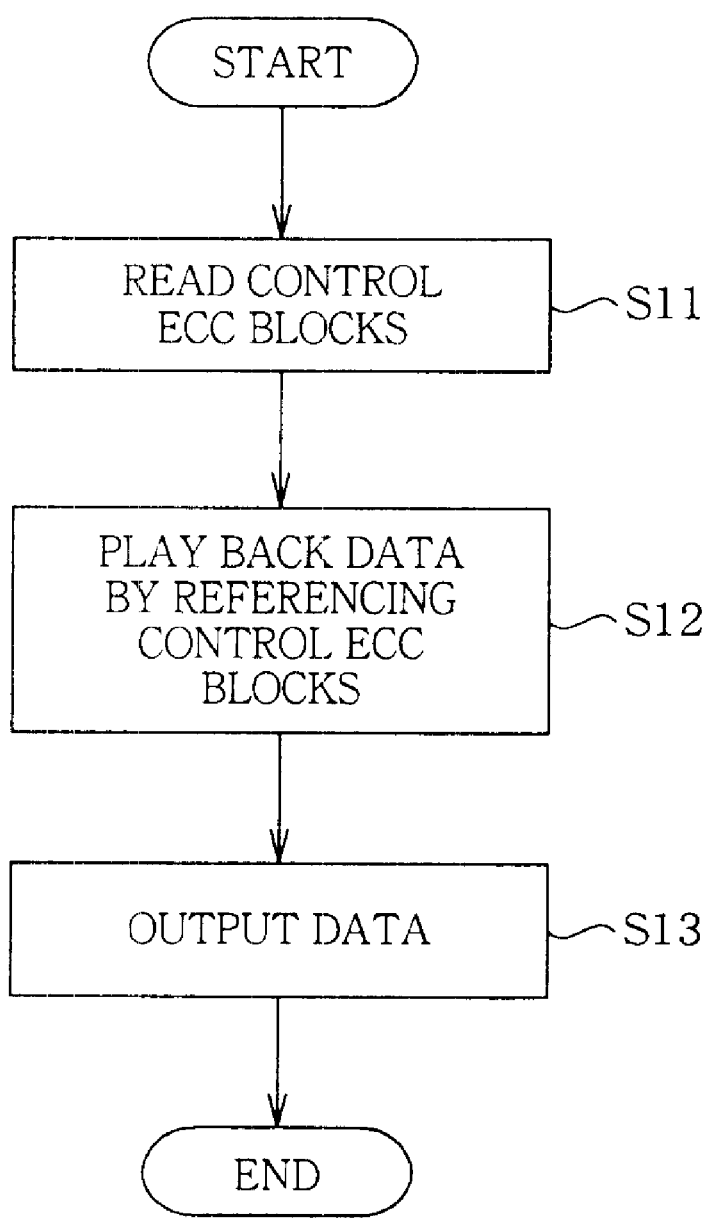
FIG. 26 is a flowchart showing the outline of how data is played back according to the present invention.

At playback time, data is read from the disc 2307 by the optical head 2306. A played-back signal processing circuit 2308 decodes recorded data, checks data for errors, and de-shuffles data. The video/audio data is sent to the a video/audio data decoding circuit 2310, and control ECC blocks are sent to a control ECC block playback circuit 2309. The control ECC block playback circuit 2309 decodes control ECC blocks and sends decoded data to the CPU control circuit 2304. The CPU control circuit 2304 controls the optical head, spindle motors, and so on with the data and commands. The video/audio data sent to the video/audio decoding circuit 2310 is de-multiplexed and de-compressed and is sent to 2311 as video/audio signals. FIG. 26 shows an example of play back process.

In the embodiment described above, MPEG-2-compressed video data is used. Video data may be compressed by other compression methods or may not be compressed. In the above embodiment, MPEG-1-compressed audio data is used. Audio data may be compressed by other compression methods or may not be compressed.

In addition, a sector may not be 2 kbytes, and an ECC block may not be 32 Kbytes. Although one ECC block is composed of 4 sectors in the embodiment, it may not be composed of 4 sectors.

In the embodiment, video/audio data is used. Other data such as sub-pictures, user data, and so on may be processed as if it was video/audio data.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-009924 (Filed on Jan. 21st, 1998) including specification, claims, drawings and summary are incorporated herein by reference in its entirety.

What is claimed is:

1. A disc control method for recording and playing back first data, second data, and control data on a disc medium, said control data being generated by a CPU (Central Processing Unit) control circuit, wherein said control data contains:
   a. a number of a first data group, a sector number of the first data group, an offset block number containing second data groups synchronizing with the first data group, and a sequence number of the starting second data group within the offset block;
   b. the number of a destination first data group after which first data groups to be merged, the number of first data groups to be merged, and the number of the first data group from which first data groups are to be merged, for changing a sequence of first data groups during playback;
   c. the number of a destination sector after which blocks are to be inserted, the number of blocks to be inserted, and the number of the sector from which blocks are to be inserted, for changing the sequence of blocks during recording; or
   d. the number of the block containing a destination second data group after which second data groups are to be inserted, the sequence number of the destination second data group within the block, the number of second data groups to be inserted, and the number of the block from which second data groups are to be inserted, for changing the sequence of second data groups during recording, said disc control method comprising the steps of:
      a. when recording data,
         (i) reading the control data from the disc when the control data is on the disc;
         (ii) reading edit data;
         (iii) editing and recording data on the disc by referencing the control data; and
         (vi) recording the updated control data on the disc; and
      b. when playing back data,
         (i) reading the control data from the disc;
         (ii) playing back data from the disc according to the control data; and
         (iii) outputting the data.

2. The disc control method according to claim 1, wherein the data and the control data are ECC blocks, each having a predetermined length and an ECC (Error Correction Code).

3. The disc control method according to claim 1, wherein the first data is video data and the second data is audio data.

4. The disc control method according to claim 3, wherein the video data is compressed by MPEG-2 (Moving Picture Expert Group) and the audio data is compressed by MPEG-1 and wherein said recording step further comprises the step of compressing the edit data and said playback step further comprises the step of de-compressing the data.

5. A disc control unit for recording and playing back first data, second data, and control data on a disc medium, said control data being generated by a CPU control circuit, wherein said control data contains:
   a. a number of a first data group, a sector number of the first data group, an offset block number containing second data groups synchronizing with the first data group, and a sequence number of the starting second data group within the offset block;
   b. the number of a destination first data group after which first data groups to be merged, the number of first data groups to be merged, and the number of the first data group from which first data groups are to be merged, for changing a sequence of first data groups during playback;
   c. the number of a destination sector after which blocks are to be inserted, the number of blocks to be inserted, and the number of the sector from which blocks are to be inserted, for changing the sequence of blocks during recording; or
   d. the number of the block containing a destination second data group after which second data groups are to be inserted, the sequence number of the destination second data group within the block, the number of second data groups to be inserted, and the number of the block from which second data groups are to be inserted, for changing the sequence of second data groups during recording, said disc control unit comprising an optical head for writing data onto the disc medium, the disc on which data is written, a data coding circuit for coding data, multiplexing data, and forming a stream, a recording signal processing circuit for shuffling, adding error correction codes, and record-coding, a control data addition circuit for generating the control data under control of the CPU control circuit, the CPU control circuit for controlling the control data addition circuit, the optical head and a spindle motor, a played-back signal processing circuit for decoding, correcting errors, and de-shuffling, a control data playback circuit for playing back the control data, a data decoding circuit for decoding data, and a processor, said processor causing said disc control unit to:

a. when recording data,
  (i) read the control data from the disc when the control data is on the disc;
  (ii) read edit data;
  (iii) edit and record data on the disc by referencing the control data; and
  (vi) record the updated control data on the disc; and
b. when playing back data,
  (i) read the control data from the disc;
  (ii) play back data from the disc according to the control data; and
  (iii) output the data.

6. A disc control unit for recording and playing back first data, second data, and control data on a disc medium, said control data being generated by a CPU control circuit, wherein said control data contains:

a. a number of a first data group, a sector number of the first data group, an offset block number containing second data groups synchronizing with the first data group, and a sequence number of the starting second data group within the offset block;
b. the number of a destination first data group after which first data groups to be merged, the number of first data groups to be merged, and the number of the first data group from which first data groups are to be merged, for changing a sequence of first data groups during playback;
c. the number of a destination sector after which blocks are to be inserted, the number of blocks to be inserted, and the number of the sector from which blocks are to be inserted, for changing the sequence of blocks during recording; or
d. the number of the block containing a destination second data group after which second data groups are to be inserted, the sequence number of the destination second data group within the block, the number of second data groups to be inserted, and the number of the block from which second data groups are to be inserted, for changing the sequence of second data groups during recording, said disc control unit comprising:

a. when recording data,
  (i) means for reading the control data from the disc when the control data is on the disc;
  (ii) means for reading edit data;
  (iii) means for editing and recording data on the disc by referencing the control data; and
  (vi) means for recording the updated control data on the disc; and
b. when playing back data,
  (i) means for reading the control data from the disc;
  (ii) means for playing back data from the disc according to the control data; and
  (iii) means for outputting the data.

7. A computer program product stored on a storage medium for controlling a disc control unit for recording and playing back first data, second data, and control data on a disc medium, said control data being generated by a CPU control circuit, wherein said control data contains:

a. a number of a first data group, a sector number of the first data group, an offset block number containing second data groups synchronizing with the first data group, and a sequence number of the starting second data group within the offset block;
b. the number of a destination first data group after which first data groups to be merged, the number of first data groups to be merged, and the number of the first data group from which first data groups are to be merged, for changing a sequence of first data groups during playback;
c. the number of a destination sector after which blocks are to be inserted, the number of blocks to be inserted, and the number of the sector from which blocks are to be inserted, for changing the sequence of blocks during recording; or
d. the number of the block containing a destination second data group after which second data groups are to be inserted, the sequence number of the destination second data group within the block, the number of second data groups to be inserted, and the number of the block from which second data groups are to be inserted, for changing the sequence of second data groups during recording, and wherein said disc control unit comprises:
  an optical head for writing data onto the disc medium,
  a data coding circuit for coding data, multiplexing data, and forming a stream,
  a recording signal processing circuit for shuffling, adding error correction codes, and record-coding,
  a control data addition circuit for generating the control data under control of the CPU control circuit,
  the CPU control circuit for controlling the control data addition circuit,
  a played-back signal processing circuit for decoding, correcting errors, and de-shuffling,
  a control data playback circuit for playing back the control data,
  and a data decoding circuit for decoding data, said program causing said disc control unit to:

a. when recording data,
  (i) read the control data from the disc when the control data is on the disc;
  (ii) read edit data;
  (iii) edit and record data on the disc by referencing the control data; and
  (vi) record the updated control data on the disc; and
b. when playing back data,
  (i) read the control data from the disc;
  (ii) play back data from the disc according to the control data; and
  (iii) output the data.

8. A disc control method for recording and playing back video data, audio data, and control ECC blocks on a disc medium, said control ECC blocks being generated by a CPU control circuit, wherein each of said control ECC blocks contains:

a. a number of a GOP (Group Of Pictures), a sector number of the GOP, an offset ECC block number containing audio frames synchronizing with the GOP, and a sequence number of the starting audio frame within the offset ECC block;

b. the number of a destination GOP after which GOPs are to be merged, the number of GOPs to be merged, and the number of the GOP from which GOPs are to be merged, for changing a sequence of GOPs during playback;

c. the number of a destination sector after which ECC blocks are to be inserted, the number of ECC blocks to be inserted, and the number of the sector from which ECC blocks are to be inserted, for changing the sequence of ECC blocks during recording; or d. the number of the ECC block containing a destination audio frame after which audio frames are to be inserted, the sequence number of the destination audio frame within the ECC block, the number of audio frames to be inserted, and the number of the ECC block from which audio frames are to be inserted, for changing the sequence of audio frames during recording, said disc control method comprising the steps of:

a. when recording data,
   (i) reading the control ECC blocks from the disc when the control ECC blocks are on the disc;
   (ii) reading edit data;
   (iii) editing and recording data on the disc by referencing the control ECC blocks; and
   (vi) recording the updated control ECC blocks on the disc; and b. when playing back data,
   (i) reading the control ECC blocks from the disc;
   (ii) playing back data from the disc according to the control ECC blocks; and
   (iii) outputting the data.

9. The disc control method according to claim 8, wherein step a. (iii) further comprises the step of:
   a. starting recording from a start of the ECC block before which one recording operation was finished.

10. The disc control method according to claim 8, wherein step a. (iii) further comprises the steps of:
   a. erasing from the start of the sector containing the GOP following the GOP containing a specified point; and
   b. for an ECC block containing both the sector to be erased and the sector not to be erased, erasing the data to be erased, filling an erased part with meaningless data, adding the ECC to the block again, and recording the ECC block again.

11. The disc control method according to claim 8, wherein step a. (iii) further comprises the steps of:
   a. erasing all data in the GOP which is in an erase range and which contains only data to be eased; and
   b. for an ECC block containing both the sector to be erased and the sector not to be erased, erasing the data to be erased, filling an erased part with meaningless data, adding the ECC to the block again, and recording the ECC block again.

12. The disc control method according to claim 10, wherein data to be erased is not erased at erase time but the control ECC block is changed so that the data to be erased is processed at playback time as if the data was erased.

13. The disc control method according to claim 8, wherein step b. (ii) further comprises the step of:
   a. playing back GOPs in the sequence different from the sequence in which GOPs are recorded.

14. The disc control method according to claim 8, wherein step a. (iii) further comprises the steps of:

a. when a number of GOPs to be inserted is equal to the number of destination GOPs and when an amount of coding of the GOPs to be inserted is smaller than the amount of coding of the destination GOPs, inserting the GOPs to be inserted into the destination GOPs and filling remaining bytes with meaningless bytes;

b. when the number of GOPs to be inserted is equal to the number of destination GOPs and when the amount of coding of the GOPs to be inserted is larger than the amount of coding of the destination GOPs, inserting the GOPs to be inserted into the destination GOPs and writing extra data in an unused area;

c. when the number of GOPs to be inserted is less than the number of destination GOPs and when the amount of coding of the GOPs to be inserted is smaller than the amount of coding of the destination GOPs, inserting the GOPs to be inserted into the destination GOPs and filling remaining bytes with meaningless bytes;

d. when the number of GOPs to be inserted is less than the number of destination GOPs and when the amount of coding of the GOPs to be inserted is larger than the amount of coding of the destination GOPs, inserting the GOPs to be inserted into the destination GOPs and writing extra data in the unused area;

e. when the number of GOPs to be inserted is more than the number of destination GOPs and when the amount of coding of the GOPs to be inserted is smaller than the amount of coding of the destination GOPs, inserting the GOPs to be inserted into the destination GOPs and filling remaining bytes with meaningless bytes; and f. when the number of GOPs to be inserted is more than the number of destination GOPs and when the amount of coding of the GOPs to be inserted is larger than the amount of coding of the destination GOPs, inserting the GOPs to be inserted into the destination GOPs and writing extra data in the unused area.

15. The disc control method according to claim 8, wherein the video data and the audio data are arranged in separate ECC blocks, wherein the video data is logically continuous across the audio data ECC block, wherein the audio data ECC block is logically continuous to the next audio data ECC block not connected physically, and wherein the video data and the audio data may be re-written independently.

16. The disc control method according to claim 15, wherein the audio data is written in the audio data ECC block and, when the audio data does not fit in said audio data ECC block, the extra audio frame data is recorded, not in said audio data ECC block, but in the next audio data ECC block.

17. The disc control method according to claim 15, the video data being divided into GOPs and the audio data being divided into frames, wherein the video data and the audio data, which are asynchronous with each other, are forced to synchronize by ignoring a difference in synchronization so that one or more GOPs and the synchronizing frames may be re-written at the same time.

18. The disc control method according to claim 15, wherein the ECC block containing audio frames is-read and edited, the ECC is added, and all data is re-written.

19. The disc control method according to claim 15, further comprising the steps of:

a. when a number of GOPs to be inserted is equal to the number of destination GOPs and when an amount of coding of the GOPs to be inserted is smaller than the amount of coding of the destination GOPs:
   (i) inserting the GOPs to be inserted into the destination GOPs and filling remaining bytes with meaningless bytes; and (ii) re-writing the synchronizing audio frames;
b. when the number of GOPs to be inserted is equal to the number of destination GOPs and when the amount of coding of the GOPs to be inserted is larger than the amount of coding of the destination GOPs:
  (i) inserting the GOPs to be inserted into the destination GOPs and writing extra data in an unused area; and
  (ii) re-writing the synchronizing audio frames;
c. when the number of GOPs to be inserted is less than the number of destination GOPs and when the amount of coding of the GOPs to be inserted is smaller than the amount of coding of the destination GOPs:
  (i) inserting the GOPs to be inserted into the destination GOPs and filling remaining bytes with meaningless bytes; and
  (ii) re-writing the synchronizing audio frames;
d. when the number of GOPs to be inserted is less than the number of destination GOPs and when the amount of coding of the GOPs to be inserted is larger than the amount of coding of the destination GOPs:
  (i) inserting the GOPs to be inserted into the destination GOPs and writing extra data in the unused area; and
  (ii) re-writing the synchronizing audio frames;
e. when the number of GOPs to be inserted is more than the number of destination GOPs and when the amount of coding of the GOPs to be inserted is smaller than the amount of coding of the destination GOPs:
  (i) inserting the GOPs to be inserted into the destination GOPs and filling remaining bytes with meaningless bytes; and
  (ii) re-writing the synchronizing audio frames corresponding to existing GOPs and writing the synchronizing audio frames corresponding to added GOPs in the unused area;
f. when the number of GOPs to be inserted is more than the number of destination GOPs and when the amount of coding of the GOPs to be inserted is larger than the amount of coding of the destination GOPs:
  (i) inserting the GOPs to be inserted into the destination GOPs and writing extra data in the unused area; and
  (ii) re-writing the synchronizing audio frames corresponding to existing GOPs and writing the synchronizing audio frames corresponding to added GOPs in the unused area.

20. A disc control unit for recording and playing back video data, audio data, and control ECC blocks on a disc medium, said control ECC blocks being generated by a CPU control circuit, wherein each of said control ECC blocks contains:
a. a number of a GOP, a sector number of the GOP, an offset ECC block number containing audio frames synchronizing with the GOP, and a sequence number of the starting audio frame within the offset ECC block;
b. the number of a destination GOP after which GOPs are to be merged, the number of GOPs to be merged, and the number of the GOP from which GOPs are to be merged, for changing a sequence of GOPs during playback;
c. the number of a destination sector after which ECC blocks are to be inserted, the number of ECC blocks to be inserted, and the number of the sector from which ECC blocks are to be inserted, for changing the sequence of ECC blocks during recording; or
d. the number of the ECC block containing a destination audio frame after which audio frames are to be inserted, the sequence number of the destination audio frame within the ECC block, the number of audio frames to be inserted, and the number of the ECC block from which audio frames are to be inserted, for changing the sequence of audio frames during recording,
said disc control unit comprising an optical head for writing data onto the disc medium,
a data coding circuit for compressing data, multiplexing data, and forming a stream,
a recording signal processing circuit for shuffling, adding error correction codes, and record-coding, a control ECC block addition circuit for generating the control ECC blocks under control of the CPU control circuit,
the CPU control circuit for controlling the control ECC block addition circuit, the optical head and a spindle motor,
a played-back signal processing circuit for record-decoding, correcting errors, and de-shuffling,
a control ECC block playback circuit for playing back the control ECC blocks, and
a data decoding circuit for de-multiplexing and de-compressing data, and a processor,
said processor causing said disc control unit to:
  a. when recording data,
    (i) read the control ECC blocks from the disc when the control ECC blocks are on the disc;
    (ii) read edit data;
    (iii) edit and record data on the disc by referencing the control ECC blocks; and
    (vi) record the updated control ECC blocks on the disc; and
  b. when playing back data,
    (i) read the control ECC blocks from the disc;
    (ii) play back data from the disc according to the control ECC blocks; and
    (iii) output the data.

21. A disc control unit for recording and playing back video data, audio data, and control ECC blocks on a disc medium, said control ECC blocks being generated by a CPU control circuit, wherein each of said control ECC blocks contains:
a. a number of a GOP, a sector number of the GOP, an offset ECC block number containing audio frames synchronizing with the GOP, and a sequence number of the starting audio frame within the offset ECC block;
b. the number of a destination GOP after which GOPs are to be merged, the number of GOPs to be merged, and the number of the GOP from which GOPs are to be merged, for changing a sequence of GOPs during playback;
c. the number of a destination sector after which ECC blocks are to be inserted, the number of ECC blocks to be inserted, and the number of the sector from which ECC blocks are to be inserted, for changing the sequence of ECC blocks during recording; or
d. the number of the ECC block containing a destination audio frame after which audio frames are to be inserted, the sequence number of the destination audio frame within the ECC block, the number of audio frames to be inserted, and the number of the ECC block from which audio frames are to be inserted, for changing the sequence of audio frames during recording, said disc control unit comprising:
  a. when recording data,
    (i) means for reading the control ECC blocks from the disc when the control ECC blocks are on the disc;

(ii) means for reading edit data;
(iii) means for editing and recording data on the disc by referencing the control ECC blocks; and
(vi) means for recording the updated control ECC blocks on the disc; and
b. when playing back data,
(i) means for reading the control ECC blocks from the disc;
(ii) means for playing back data from the disc according to the control ECC blocks; and
(iii) means for outputting the data.

22. A computer program product stored on a storage medium for controlling a disc control unit for recording and playing back video data, audio data, and control ECC blocks on a disc medium, said control ECC blocks being generated by a CPU control circuit, wherein each of said control ECC blocks contains:
a. a number of a GOP, a sector number of the GOP, an offset ECC block number containing audio frames synchronizing with the GOP, and a sequence number of the starting audio frame within the offset ECC block;
b. the number of a destination GOP after which GOPs are to be merged, the number of GOPs to be merged, and the number of the GOP from which GOPs are to be merged, for changing a sequence of GOPs during playback;
c. the number of a destination sector after which ECC blocks are to be inserted, the number of ECC blocks to be inserted, and the number of the sector from which ECC blocks are to be inserted, for changing the sequence of ECC blocks during recording; or
d. the number of the ECC block containing a destination audio frame after which audio frames are to be inserted, the sequence number of the destination audio frame within the ECC block, the number of audio frames to be inserted, and the number of the ECC block from which audio frames are to be inserted, for changing the sequence of audio frames during recording
and wherein said disc control unit comprises an optical head for writing data onto the disc medium,
a data coding circuit for coding data, multiplexing data, and forming a stream,
a recording signal processing circuit for shuffling, adding error correction codes, and record-coding,
a control ECC block addition circuit for generating the control ECC blocks under control of the CPU control circuit,
the CPU control circuit for controlling the control ECC block addition circuit,
a played-back signal processing circuit for decoding, correcting errors, and de-shuffling,
a control data playback circuit for playing back the control ECC blocks, and
a data decoding circuit for decoding data,
said program causing said disc control unit to:
a. when recording data,
(i) read the control ECC blocks from the disc when the control ECC blocks are on the disc;
(ii) read edit data;
(iii) edit and record data on the disc by referencing the control ECC blocks; and
(vi) record the updated control ECC blocks on the disc; and
b. when playing back data,
(i) read the control ECC blocks from the disc;
(ii) play back data from the disc according to the control blocks; and
(iii) output the data.

* * * * *